(12) United States Patent
Jia et al.

(10) Patent No.: US 10,676,598 B2
(45) Date of Patent: Jun. 9, 2020

(54) ACTIVATED ISOBUTYLENE-ISOPRENE RUBBER AND THERMOSET RUBBER THEREFROM

(71) Applicants: Li Jia, Hudson, OH (US); Yu Sun, Cuyahoga Falls, OH (US); Mara Kuenen, Middlesex, NY (US)

(72) Inventors: Li Jia, Hudson, OH (US); Yu Sun, Cuyahoga Falls, OH (US); Mara Kuenen, Middlesex, NY (US)

(73) Assignee: THE UNIVERSITY OF AKRON, Akron, OH (US)

( * ) Notice: Subject to any disclaimer, the term of this patent is extended or adjusted under 35 U.S.C. 154(b) by 131 days.

(21) Appl. No.: 16/053,048

(22) Filed: Aug. 2, 2018

(65) Prior Publication Data

US 2020/0040165 A1 Feb. 6, 2020

Related U.S. Application Data

(60) Provisional application No. 62/540,260, filed on Aug. 2, 2017.

(51) Int. Cl.
*C08L 9/00* (2006.01)
*C08C 19/28* (2006.01)

(52) U.S. Cl.
CPC .............. *C08L 9/00* (2013.01); *C08C 19/28* (2013.01)

(58) Field of Classification Search
CPC ................................ C08C 19/36; C08C 19/28
See application file for complete search history.

(56) References Cited

U.S. PATENT DOCUMENTS

2017/0081455 A1* 3/2017 Jia ......................... C08L 21/00

* cited by examiner

*Primary Examiner* — Mark S Kaucher
(74) *Attorney, Agent, or Firm* — Renner Kenner Greive Bobak Taylor & Weber

(57) ABSTRACT

In one or more embodiments, the present invention provides an way to modify the isoprene unit using an alder-ene reaction to form thermoset compounds comprising the resultant electron-deficient, readily crosslinkable polyisobutylene-based rubber that avoids the use of corrosive bromine or chlorine to make the activated butyl rubber, is easier to crosslink than the halobutyls, allows crosslinking with a simple organic base or a peroxide, and has mechanical properties as good as or better than sulfur crosslinked butyl rubbers.

22 Claims, 8 Drawing Sheets

ACTIVATED ISOBUTYLENE-ISOPRENE RUBBER AND THERMOSET RUBBER THEREFROM

CROSS REFERENCE TO RELATED APPLICATIONS

This application claims the benefit of U.S. provisional patent application Ser. No. 62/540,260 entitled "Activated Isobutylene-Isoprene Rubber and Thermoset Rubber Therefrom," filed Aug. 2, 2017, and incorporated herein by reference in its entirety.

STATEMENT REGARDING FEDERALLY SPONSORED RESEARCH OR DEVELOPMENT SUPPORT

This invention was made with government support under NSF-DMR 1610109 awarded by the National Science Foundation. The government has certain rights in the invention.

FIELD OF THE INVENTION

One or more embodiments of the present invention relates to an isobutylene-isoprene rubber compound. In certain embodiments, the present invention relates to an activated isobutylene-isoprene rubber compound and thermoset rubber made therefrom.

BACKGROUND OF THE INVENTION

Butyl rubber was first synthesized in 1937. It is the copolymer of isobutylene with a small amount of isoprene that is used as crosslinking site, and hence is also commonly known as isobutylene-isoprene rubber (IIR). Butyl rubber has excellent gas impermeability and chemical stability and so is widely used for inner tubes and inner liners of pneumatic tires. The heat resistance of butyl rubber renders its use for tire curing bags and bladders. Its resistance to ozone, weather, and moisture renders its use for roofing, reservoir membranes, electrical insulation, and automotive components. Isobutylene-isoprene rubber (IIR) has the general formula:

Polymer 1

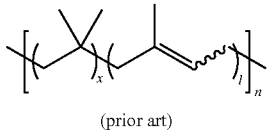

(prior art)

where x is an average number from 10 to 150; and n is an integer from about 100 to 10,000; and ⌒ reflects the cis/trans isomers centered on the adjacent double bond.

A viscoelastic rubber must be crosslinked to removes the translational mobility of the chains in order to become an elastic solid. Isoprene units in butyl rubber are the reactive sites for crosslinking. Because of the low concentration of unsaturated bonds, crosslinking of butyl rubber is slow or requires high temperature compared to highly unsaturated elastomers like natural rubber. This makes butyl rubber curing incompatible with curing of highly unsaturated rubbers such as natural rubber and styrene-butadiene rubber (SBR). There have been many attempts at making faster curing butyl rubber. For example, it was found that increasing the amount of isoprene units increased the curing rate. However, increasing the amount of isoprene in these systems was also found to depress the molecular weight of butyl rubber since the isoprene was a powerful chain transfer agent in polymerization.

Halogenated butyl rubbers developed in 1950's are very successful in this regard. Polymer 2 is an example of these halogenated butyl rubbers and has the formula:

Polymer 2

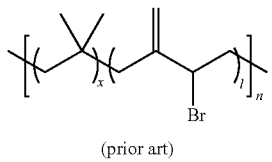

(prior art)

where x is an average number from 50 to 100; n is an integer from about 100 to 1000; and ⌒ reflects the cis/trans isomers centered on the adjacent double bond. After halogenation of the isoprene units, the vulcanization rate significantly improves, rendering halobutyl rubbers better compatibility with highly unsaturated rubbers. As the result, halobutyl rubbers are the common choice for inner liners in tubeless tires.

Sulfur-accelerated vulcanization is the most popular method to cure butyl and halogenated butyl rubber. However, sulfur-cured vulcanization often produces materials that show poor high temperature properties due to the low dissociation energy of sulfidic crosslinks. These materials tend to soften when exposed to elevated temperatures of 300-400° F. for an extended period. In addition, these vulcanized products contain leachable and extractable residues, which has limited their application in pharmaceutical industry.

Carbon-carbon bonds are much more stable than the sulfur-sulfur bonds formed during vulcanization, giving better heat resistance. Peroxide is often used to introduce carbon-carbon bonds into elastomers to crosslink the elstomers. It is also known that these peroxide systems only generate small amounts of reaction byproducts. Unfortunately, however, in butyl rubber-peroxide systems, it has been found that the peroxide decomposes butyl rubber rather than crosslinking it.

Many attempts have been made to prepare a peroxide-curable butyl rubber, which could extend the application of butyl rubber. Chain scission efficiency of butyl rubber was found to decrease by increasing the unsaturation of butyl rubber, where butyl rubber could be crosslinked by peroxide when isoprene content was above 3 mol %. (See, Loan, L., The reaction between dicumyl peroxide and butyl rubbers. *Journal of Polymer Science Part A: Polymer Chemistry* 1964, 2 (5), 2127-2134, the disclosure of which is incorporated herein by reference in its entirety.) However, the molecular weight of butyl rubber was depressed by increasing the amount of isoprene units, which, as noted above, was a powerful chain transfer agent in polymerization. A terpolymer of isobutene, isoprene and divinylbenzene that can be crosslinked by peroxide has also been synthesized, but crosslinking in these systems happens during polymerization of the terpolymer, and they are difficult to process due to high gel fraction in the terpolymer.

Post-polymerization chemical modification is another way of crosslinking butyl rubbers that is often used in HIIR, owing to the higher reactivity of allylic halogen functionality compared to regular butyl rubber. In these systems ether, ester, ammonium or phosphonium functionalities are introduced into the HIIR by nucleophilic substitution reactions, in which an aliphatic alcohol, carboxylate salt, amine or phosphine are used as nucleophile, depending upon the functionality to be introduced. These elastomer derivatives contain pendent polymerizable functional groups such as styrenic, acrylic, maleimidic and vinylic functional groups, which act as crosslinking sites. The network forms rapidly due to high reactivity of these functional groups. These systems, however, are is limited by the allylic bromide content of starting material (bromobutyl rubber), have issues with chain scission, and do not produce materials having mechanical properties comparable with sulfur cured butyl rubbers. Another peroxide-curable butyl rubber has been synthesized via Suzuki-Miyaura coupling reaction of HIIR with 4-vinylphenylboronic acid and phenylboronic acid. The crosslinking density of resulting polymer in these systems is controlled by changing ratio of the two boronic acids. In these systems, however, material has to be purified for synthesis, since the acidic residue contained in material spoils the catalyst, which results in the low coupling efficiency. Similarly, epoxidized butyl rubbers have been synthesized by using m-chloroperoxybenzoic acid with regular butyl rubber. The ring-opening/elimination of epoxidized butyl rubber provides another way to prepare multifunctional graft copolymers, but does not produce materials having mechanical properties comparable with sulfur cured butyl rubbers. In other cases, maleic anhydride has been grafted on regular butyl rubber by using peroxide to improve its adhesion performance, but this approach was also found to cause decrease of molecular weight of the butyl rubber.

While, as set forth above, various derivatives of butyl rubber can be crosslinked by peroxide, the mechanical properties of peroxide cured butyl rubbers, such as tensile strength, strain at break, or toughness, are still inferior to those vulcanized by sulfur. Co-agents which contains multiple allylic, acrylic, or maleimide groups are frequently applied in peroxide system to increase crosslinking density of product. In HIIR-peroxide systems, for example, bismaleimide has often been used. These co-agent systems also fail to produce materials having mechanical properties comparable with sulfur cured butyl rubbers. A series of co-curing butyl rubber derivatives from BIIR have been synthesized. It has been found that co-curing elastomers bearing polyether, vinyl ether side chains provide good crosslinking yields due to their reactivity with N-arylmaleimides. But again, these systems fail to produce materials having mechanical properties comparable with sulfur cured butyl rubbers.

What is needed in the art is an efficient way to modify the isobutylene-isoprene rubber to produce a readily crosslinkable polyisobutylene-based rubber that avoids the use of corrosive bromine or chlorine to make the activated butyl rubber and is easier to crosslink than known halobutyls by, for example, crosslinking using a simple organic base or peroxide.

SUMMARY OF THE INVENTION

In one or more embodiments, the present invention provides an way to modify the isoprene unit using an alder-ene reaction to form thermoset compounds comprising the resultant electron-deficient, readily crosslinkable polyisobutylene-based rubber that avoids the use of corrosive bromine or chlorine to make the activated butyl rubber, is easier to crosslink than the halobutyls, allows crosslinking with a simple organic base or a peroxide, and has mechanical properties as good as or better than sulfur crosslinked butyl rubbers.

In a first aspect, the present invention is directed to a curable rubber compound comprising one or more curative and an isobutylene-isoprene rubber derivative having the structure:

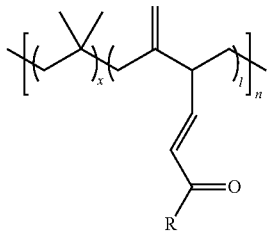

where R is an alkoxy group, alkyl group, aryl group or hydrogen, x is an average number from 20 to 100, and n is an average number from 200 to 500. In some of these embodiments, R is selected from the group consisting of methoxy, ethoxy, t-butoxy, phenoxy, pentafluorophenoxy, methyl, ethyl, t-butyl, and phenyl, and combinations thereof.

In one or more embodiments, the curable rubber compound of the present invention includes any one or more of the above referenced embodiments of the first aspect of the present invention wherein the one or more curative comprises sulfur. In one or more embodiments, the curable rubber compound of the present invention includes any one or more of the above referenced embodiments of the first aspect of the present invention wherein the one or more curative comprises an organic base. In one or more embodiments, the curable rubber compound of the present invention includes any one or more of the above referenced embodiments of the first aspect of the present invention wherein the one or more curative comprises a peroxide. In one or more embodiments, the curable rubber compound of the present invention includes any one or more of the above referenced embodiments of the first aspect of the present invention wherein the one or more curative comprises a phenolic resin curative. In one or more embodiments, the curable rubber compound of the present invention includes any one or more of the above referenced embodiments of the first aspect of the present invention further comprising one or more co-agents.

In a second aspect, the present invention is directed to a method for making the curable rubber compound described above comprising: preparing an isobutylene-isoprene rubber derivative having the structure:

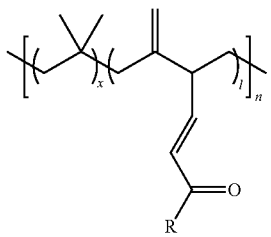

where R is an alkyl group, alkoxy group, aryl group or hydrogen, x is an average number from 20 to 100, and n is an average number from 20 to 500; adding a curative; and mixing to distribute the curative throughout the isobutylene-isoprene rubber derivative. In some of these embodiments, the step of preparing an isobutylene-isoprene rubber derivative comprises reacting an isobutylene-isoprene rubber with an acetylenyl organic carbonyl compound having the structure:

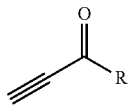

where R is an alkyl group, alkoxy group, aryl group or hydrogen.

In one or more embodiments, the method of the present invention includes any one or more of the above referenced embodiments of the second aspect of the present invention wherein the step of preparing an isobutylene-isoprene rubber derivative comprises: preparing an isobutylene-isoprene rubber having the formula:

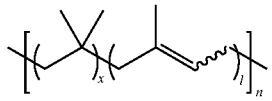

where R is an organic group or hydrogen, x is an average number from 20 to 100, and n is an average number from 20 to 500; preparing a an acetylenyl organic carbonyl compound having the structure:

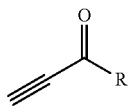

where R is an alkyl group, alkoxy group, aryl group or hydrogen; and combining the isobutylene-isoprene rubber and the acetylenyl organic carbonyl compound in a saturated hydrocarbon solvent and initiating a alder-ene reaction between the triple bond in the acetylenyl organic carbonyl compound and the unsaturated double bond in an isoprene unit in the isobutylene-isoprene rubber to produce the isobutylene-isoprene rubber derivative. In one or more embodiments, the method of the present invention includes any one or more of the above referenced embodiments of the second aspect of the present invention wherein R is selected from the group consisting of methoxy, ethoxy, t-butoxy, phenoxy, pentafluorophenoxy, methyl, ethyl, t-butyl, and phenyl, and combinations thereof.

In one or more embodiments, the method of the present invention includes any one or more of the above referenced embodiments of the second aspect of the present invention wherein the reaction between the isobutylene-isoprene rubber and the acetylenyl organic carbonyl compound is carried out in a saturated hydrocarbon solvent at a temperature between 20° C. to 150° C. In one or more embodiments, the method of the present invention includes any one or more of the above referenced embodiments of the second aspect of the present invention wherein the alder-ene reaction between the isobutylene-isoprene rubber and the acetylenyl organic carbonyl compound is catalyzed by a Lewis acid. In one or more embodiments, the method of the present invention includes any one or more of the above referenced embodiments of the second aspect of the present invention wherein the Lewis acid is selected from the group consisting of aluminum trichloride, ethylaluminum dichloride, tris(pentafluorophenyl)boron, titanium tetrachloride, and combinations thereof.

In one or more embodiments, the method of the present invention includes any one or more of the above referenced embodiments of the second aspect of the present invention wherein the step of adding a curative comprises adding a curative selected group the group consisting of sulfur-based curatives, organic base-based curatives, peroxide based curatives, and combinations thereof. In one or more embodiments, the method of the present invention includes any one or more of the above referenced embodiments of the second aspect of the present invention wherein the step of adding a curative further comprises adding one or more co-agent.

In a third aspect, the present invention is directed to an organic base-cured rubber compound comprising an isobutylene-isoprene rubber derivative having the structure:

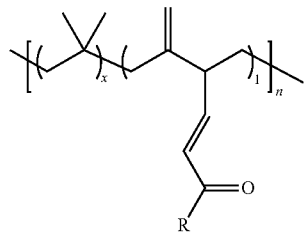

where R is an alkyl group, alkoxy group, aryl group or hydrogen, x is an average number from 20 to 100, and n is an average number from 20 to 500. In one or more of these embodiments, the organic base-cured rubber compound, having a tensile strength as measured by a tensometer, toughness as measured by tensometer, or elongation as measured by tensometer, that is at least as good as a comparable sulfur cured isobutylene-isoprene butyl rubber.

In a fourth aspect, the present invention is directed to a peroxide-cured rubber compound comprising an isobutylene-isoprene rubber derivative having the structure:

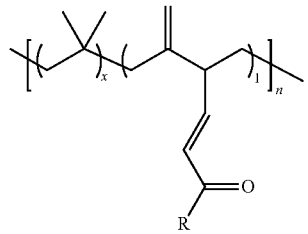

where R is an alkyl group, alkoxy group, aryl group or hydrogen, x is an average number from 20 to 100, and n is an average number from 20 to 500. In one or more of these embodiments, the peroxide-cured rubber compound will having a tensile strength, toughness, and eleongation, as measured by a tensometer, that is at least as good as a comparable sulfur cured isobutylene-isoprene butyl rubber.

BRIEF DESCRIPTION OF THE DRAWINGS

For a more complete understanding of the features and advantages of the present invention, reference is now made to the detailed description of the invention along with the accompanying figures in which.

DETAILED DESCRIPTION OF THE ILLUSTRATIVE EMBODIMENTS

Figure 1:
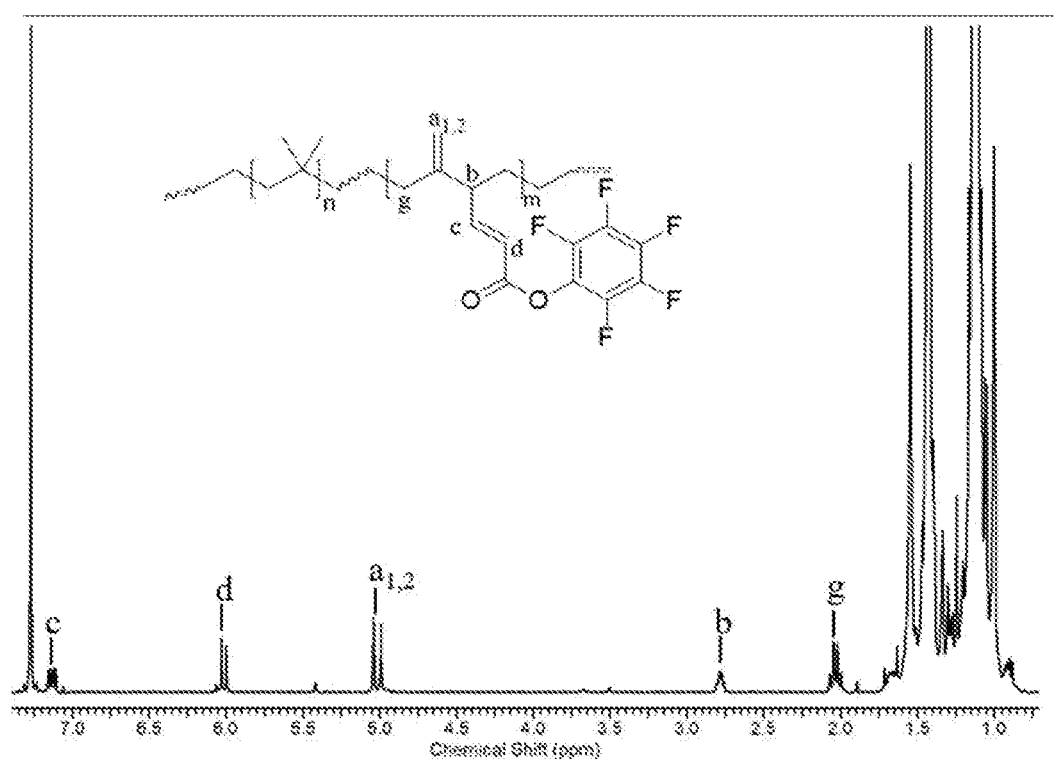
FIG. 1 is a $^1$H NMR spectrum of Polymer 3 in CDCl$_3$.

In one or more embodiments, the present invention provides an way to modify the isoprene unit using an alder-ene reaction and thermoset compounds comprising the resultant electron-deficient, readily crosslinkable polyisobutylene-based rubber that avoids the use of corrosive bromine or chlorine to make the activated butyl rubber, allows crosslinking with a simple amine base or a peroxide, and has mechanical properties as good as, or better than, conventional sulfur crosslinked butyl rubbers.

In a first aspect, the present invention is directed to an isobutylene-isoprene rubber derivative functionalized to have two unsaturated bonds and a pendent organic carbonyl group in one or more of its isoprene units. These isobutylene-isoprene rubber derivatives can be formed by the facile functionalization of some or all of the isoprene units of a standard isobutylene-isoprene rubber with an acetylenyl organic carbonyl compound using an alder-ene reaction, as will be discussed in more detail below. This reaction introduces an additional unsaturation and adds a pendent organic carbonyl group to the isoprene unit units in the isobutylene-isoprene rubber. Without wishing to be limited by theory in any way, it is believed that the location of the organic carbonyl group and the two unsaturated bonds in close proximity to each other in the functionalized isoprene units of the polymer (see, General Structure, below) provide a particularly stable crosslinking site. In any event, these functionalized isoprene units have been found to be unexpectedly stable and effective crosslinking sites generally and, in particular, for amine base and/or peroxide based crosslinking reactions.

In one or more embodiments, the isobutylene-isoprene rubber derivatives of the present invention will comprise a polymer having the general structure:

General Structure

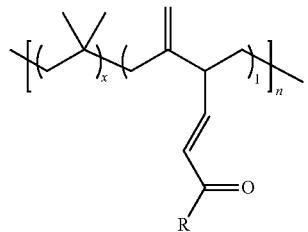

where R is an alkyl group, alkoxy group, aryl group, organic group or hydrogen, x is an average number from 20 to 100, and n is an average number from 20 to 500. As will be apparent to those of skill in the art, the isobutylene-isoprene rubber derivatives having the general structure shown above are random co polymers of isobutylene and isoprene and as such, the values for x and n can vary greatly between and within these polymers. Accordingly, x and n are both defined in terms of an average value for a polymer being tested. In some embodiments, the average value is determined by integrating the $^1$H NMR of the polymer. In one or more of these embodiments, R may be a methoxy group, ethoxy group, t-butoxy group, phenoxy group, pentafluorophenoxy group, methyl group, ethyl group, t-butyl group, phenyl group, or a combinations thereof. In some embodiments, R is a pentafluorophenoxy group. In some other embodiments, R is an ethoxy group. In some embodiments, R may be any organic group that does not prevent crosslinking or degrade the polymer.

In some embodiments, x may be an average number from 20 to 90, in other embodiments, from 20 to 80, in other embodiments, from 20 to 70, in other embodiments, from 20 to 60, in other embodiments, from 30 to 100, in other embodiments, from 40 to 100, in other embodiments, from 50 to 100, and in other embodiments, from 50 to 100. In some embodiments, n may be an average number from 100 to 500, in other embodiments, from 200 to 500, in other embodiments, from 300 to 500, in other embodiments, from 400 to 500, in other embodiments, from 50 to 400, in other embodiments, from 50 to 300, in other embodiments, from 50 to 200, and in other embodiments, from 50 to 100. Here, as well as elsewhere in the specification and claims, individual range values can be combined to form additional non-disclosed ranges.

In some embodiments, the ratio of isobutylene residues/units to functionalized isoprene residues/units is from about 20:1 to about 100:1. As used herein, the term "residue(s)" is used to refer generally to the part of a monomer or other chemical unit that has been incorporated into a polymer or large molecule. The terms "isobutylene unit(s)" and "isobutylene residues(s)" are used herein interchangeably to refer to the part of an isobutylene monomer that has been incorporated into the isobutylene-isoprene rubber derivative of the present invention. Accordingly, the terms "isoprene unit(s)" and "isoprene residues(s)" are used herein interchangeably to refer to the part(s) of a isoprene monomer that has been incorporated into the isobutylene-isoprene rubber derivative of the present invention and the terms "functionalized isoprene unit(s)" and "functionalized isoprene residues(s)" are used herein interchangeably to refer to "isoprene unit(s)" and "isoprene residues(s)" that have been functionalized via a an alder-ene reaction with an acetylenyl organic carbonyl compound to have an additional unsaturated double bond and a pendent organic carbonyl group. As used herein, the term "organic carbonyl group" refers to a functional organic group containing a carbon atom double bonded to an oxygen atom, and may include, without limitation, carbonyl groups (i.e., R in the General Structure is an alkyl or aryl group), ester groups (i.e., R in the General Structure is an alkyl or aryl group joined to the carbonyl carbon by an oxygen atom), aldyhyde groups (i.e., R in the General Structure is H) or carboxyl groups (i.e., R in the General Structure is OH).

In some embodiments, the ratio of isobutylene units to functionalized isoprene units is from about 25:1 to about 100:1, in other embodiments, from about 35:1 to about 100:1, in other embodiments, from about 45:1 to about 100:1, in other embodiments, from about 55:1 to about 100:1, in other embodiments, from about 65:1 to about 100:1, in other embodiments, from about 20:1 to about 90:1, in other embodiments, from about 20:1 to about 80:1, in other embodiments, from about 20:1 to about 70:1, and in other embodiments, from about 20:1 to about 60:1. Here, as well as elsewhere in the specification and claims, individual range values can be combined to form additional non-disclosed ranges.

In one or more embodiments, the isobutylene-isoprene rubber derivative of the present invention may have a number average weight ($M_n$) of from about $1 \times 10^3$ g/mole to about $1 \times 10^7$ g/mole. In some embodiments, the isobutylene-isoprene rubber derivative of the present invention will have a number average weight ($M_n$) of from about $1 \times 10^4$ g/mole to about $1 \times 10^7$ g/mole, in other embodiments, from about $1 \times 10^5$ g/mole to about $1 \times 10^7$ g/mole, in other embodiments, from about $1 \times 10^3$ g/mole to about $1 \times 10^6$ g/mole, in other embodiments, from about $1 \times 10^3$ g/mole to about $1 \times 10^5$ g/mole, and in other embodiments, from about $1 \times 10^3$ g/mole to about $1 \times 10^7$ g/mole.

In some embodiments, the isobutylene-isoprene rubber derivative of the present invention will have the following structure:

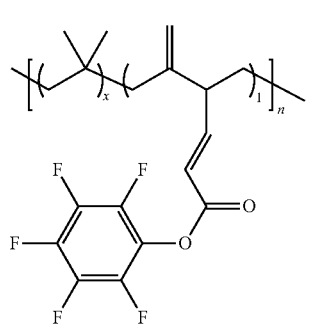

Polymer 3 where x is an average number from 20 to 100, and n is an average number from 20 to 500. In various embodiments, x and n may be as described above with respect to the general structure of the polymer. In various embodiments, the ratio of isobutylene units to functionalized isoprene units and number average molecular weight ($M_n$) may be as described above with respect to the general structure of the polymer. $^1$H NMR and $^{19}$F NMR spectra of Polymer 3 are attached as FIGS. 1 and 2.

In some embodiments, the isobutylene-isoprene rubber derivative of the present invention will have the following structure:

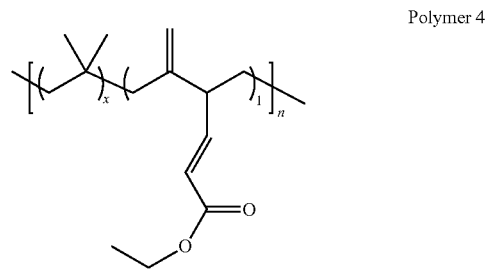

Polymer 4 where x is an average number from 20 to 100, and n is an average number from 20 to 500. In various embodiments, x and n may be as described above with respect to the general structure of the polymer. In various embodiments, the ratio of isobutylene units to functionalized isoprene units and number average molecular weight ($M_n$) may be as described above with respect to the general structure of the polymer. A $^1$H NMR spectrum of Polymer 3 is attached as FIG. 3.

In another aspect, the present invention is directed to a method of making the isobutylene-isoprene rubber derivative described above. In general outline, the isobutylene-isoprene rubber derivative is made by reacting an isobutylene-isoprene rubber (see Polymer 1, above) with an acetylenyl organic carbonyl compound as shown in Scheme 1, below.

Scheme 1

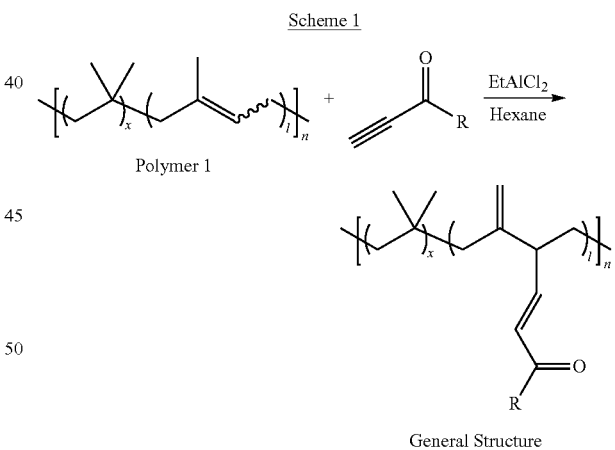

General Structure where R is an alkyl group, alkoxy group, aryl group, organic group or hydrogen; x is an average number from 20 to 100; n is an integer from about 20 to about 500; and ⁓ reflects the cis/trans isomers centered on the adjacent double bond. In various embodiments, x and n may be as set forth above with respect to Polymers 1, 3 and 4.

In one or more of these embodiments, the reaction between the isobutylene-isoprene rubber (Polymer 1) and the acetylenyl organic carbonyl compound is carried out in a saturated hydrocarbon solvent at a temperature between 20° C. to 150° C. for 0.1 hour to 24 hours using a Lewis acid catalyst. In one or more embodiment, the isobutylene-isoprene rubber may be Exxon Butyl 268S (ExxonMobil Chemical Company, (Spring, Tex.)). In some embodiments, the isobutylene-isoprene rubber (Polymer 1) and the acetylenyl organic carbonyl compound are combined at a mole ratio of about 1:1. In some other embodiments, however, an excess of the acetylenyl organic carbonyl compound may be used to ensure that the isobutylene-isoprene rubber will be functionalized to the maximum extent possible. As will also be apparent, if less than full functionalization of the isobutylene-isoprene rubber were to be desired, less acetylenyl organic carbonyl compound may be used.

The saturated hydrocarbon solvent is not particularly limited and one of ordinary skill in the art will be able to select a suitable saturated hydrocarbon solvent without undue experimentation. In various embodiments, a suitable saturated hydrocarbon solvent may include, without limitation, of hexane, heptane, and octane, or combinations thereof. The Lewis acid catalyst is likewise not particularly limited and one of ordinary skill in the art will be able to select a suitable Lewis acid catalyst without undue experimentation. In various embodiments, a suitable Lewis acid catalyst may include, without limitation, $EtAlCl_2$, $AlCl_3$ or a combination thereof. In various embodiments, from about 0.8 eq. to about 5 eq. of a Lewis acid catalyst, such as $EtAlCl_2$, are used per eq. of isoprene double bonds.

In some of these embodiments, the reaction between the isobutylene-isoprene rubber with the acetylenyl organic carbonyl compound may be carried out at a temperature of from about 25° C. (approximate room temperature) to about 150° C., in other embodiments, from about 75° C. to about 150° C., in other embodiments, from about 100° C. to about 150° C., in other embodiments, from about 50° C. to about 125° C., in other embodiments, from about 50° C. to about 100° C., and in other embodiments, from about 50° C. to about 100° C. In one or more of these embodiments, the reaction between isobutylene-isoprene rubber with an acetylenyl organic carbonyl compound is catalyzed by a Lewis acid. In various embodiments, suitable Lewis acids may include, without limitation, aluminum trichloride, ethylaluminum dichloride, tris(pentafluorophenyl)boron, titanium tetrachloride, or a combinations thereof.

In one or more embodiments, the acetylenyl organic carbonyl compound will have the structure:

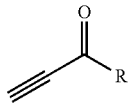

where R is an alkyl group, alkoxy group, aryl group or hydrogen. In one or more of these embodiments, R may be a methoxy group, ethoxy group, t-butoxy group, phenoxy group, pentafluorophenoxy group, methyl group, ethyl group, t-butyl group, phenyl group, or a combinations thereof. In one or more embodiments, the acetylenyl organic carbonyl compound will have the structure:

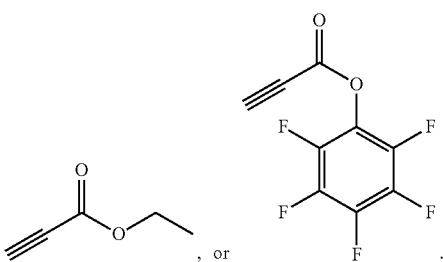

, or

The acetylenyl organic carbonyl compound may be obtained through commercial sources or synthesized using any method known in the art for that purpose. In some embodiments, the acetylenyl organic carbonyl compound may be ethyl propiolate (Sigma-Aldrich (St. Louis, Mo.)). In some other embodiments, acetylenyl organic carbonyl compound may be perfluorophenyl propiolate ester. In one or more of these embodiments, the perfluorophenyl propiolate ester may be synthesized as shown in Scheme 2, below.

Scheme 2

Synthesis of perfluorophenyl propiolate ester

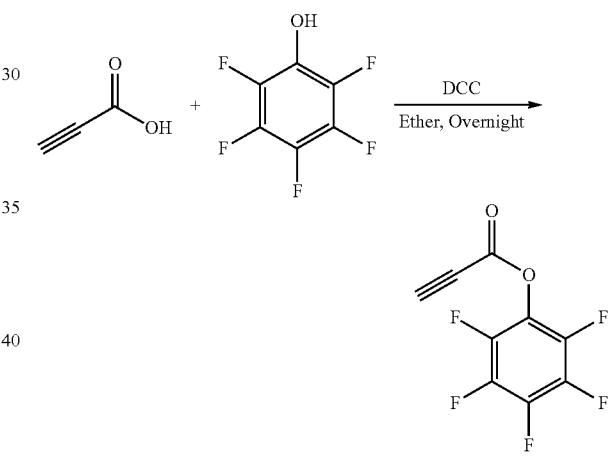

In these embodiments, an anhydrous organic solvent such as, anhydrous ether, chloroform, or hexane, pentafluorophenol, propiolate acid and a dehydrating agent, such as N,N'-dicyclohexylcarbodiimide (DCC), are combined in a suitable sealed reaction vessel in an ice bath or other heat sink and stirred for from about 5 to about 20 hours. The reaction vessel is then removed from the ice bath or other heat sink used and stirred overnight. The resulting product is then filtered to remove the insoluble N,N'-dicyclohexylurea (DCU) and purified to produce the perfluorophenyl propiolate ester. In some embodiments, perfluorophenyl propiolate pster may be synthesized as set forth in Scavuzzo, J. J.; Yan, X.; Zhao, Y.; Scherger, J. D.; Chen, J.; Zhang, S.; Liu, H.; Gao, M.; Li, T.; Zhao, X., "Supramolecular elastomers. Particulate β-sheet nanocrystal-reinforced synthetic elastic networks." *Macromolecules* 2016, 49 (7), 2688-2697, the disclosure of which is incorporated herein by reference in its entirety.

In one or more embodiment, Polymer 3 may then be made using the perfluorophenyl propiolate ester as the acetylenyl organic carbonyl compound as shown in Scheme 3, below.

Scheme 3

Synthesis of Polymer 3

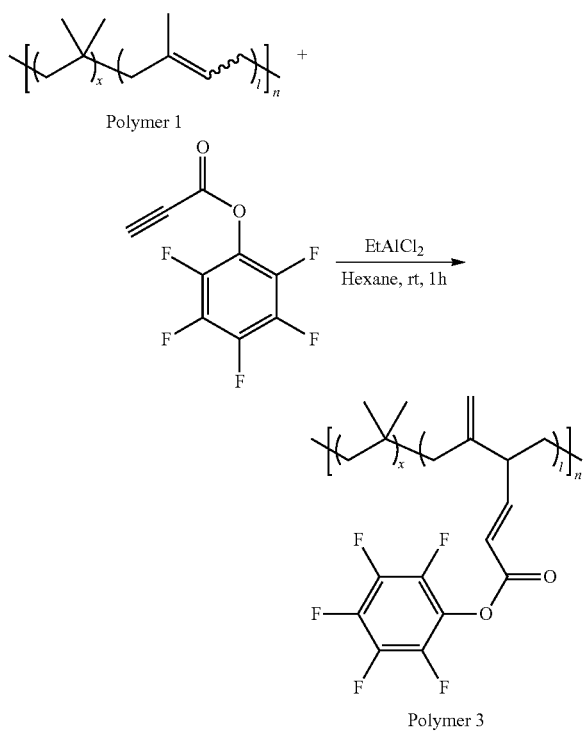

Polymer 3 where x is an average number from 20 to 100; n is an integer from about 20 to about 500; and ⁓ reflects the cis/trans isomers centered on the adjacent double bond. In various embodiments, x and n may be as set forth above with respect to Polymers 1 and 3. In these embodiments, Polymer 3 is synthesized from Polymer 1 using the general method described above, using perfluorophenyl propiolate ester as the acetylenyl organic carbonyl compound. In various embodiments, the perfluorophenyl propiolate ester is reacted with Polymer 1 at room temperature for from 1 to about 12 hours. In some of these embodiments, the reaction is substantially complete in about one hour. In one or more of these embodiments, about 1 eq. of ethyl aluminum dichloride (EtAlCl$_2$) Lewis acid catalyst is used per eq. of isoprene double bonds.

In one or more embodiment, Polymer 4 may be made using ethyl propiolate as the acetylenyl organic carbonyl compound as shown in Scheme 4, below.

Scheme 4

Synthesis of Polymer 4

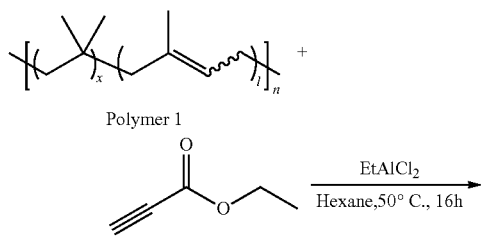

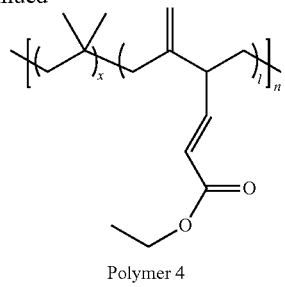

Polymer 4 where x is an average number from 20 to 100; n is an integer from about 20 to about 500; and ⁓ reflects the cis/trans isomers centered on the adjacent double bond. In various embodiments, x and n may be as set forth above with respect to Polymers 1 and 4. In these embodiments, Polymer 4 may be synthesized using the general method described above using ethyl propiolate as the acetylenyl organic carbonyl compound. This reaction, however, generally requires higher reaction times and temperatures that the reaction for synthesizing of Polymer 3 shown in Scheme 3. In various embodiments, the ethyl propiolate is reacted with Polymer 1 at about 50° C. for about 16 hours. However, as will be apparent, reaction time can be reduced by increasing the amount of catalyst used. In one or more of these embodiments, about 2.1 eq. of ethyl aluminum dichloride (EtAlCl$_2$) Lewis acid catalyst is used per eq. of isoprene double bonds.

In another aspect, the present invention is directed to a curable rubber compound comprising the isobutylene-isoprene rubber derivative described above and one or more curatives. As used herein, the terms "curing" and "vulcanization" are used interchangeably to refer to a process where an elastomeric compound, such as one containing the isobutylene-isoprene rubber derivatives described above, is transformed from a yielding plastic material to an elastic material by the formation of crosslinks within the elastomeric compound. Accordingly, the term "curable" is used to refer to an elastomeric compound that is capable of being crosslinked to form an elastic "cured" material, generally through the use of a curing agent, together with heat and/or pressure. The terms "curative" and "curing agent" are used herein interchangeably to refer to a compounding material which forms crosslinks in the isobutylene-isoprene rubber derivative described above, generally during a post-compounding curing step. In various embodiments, the curable rubber compounds of the present invention will all include one or more of the isobutylene-isoprene rubber derivatives described above, compounded with a curative, and optionally with one or more co-agent.

Depending upon which of the isobutylene-isoprene rubber derivatives described above is used, the curative may comprise one or more sulfur curative, one or more amine or other organic base-based curative, a phenolic resin curative, or an organic peroxide-based curative, and is preferably an amine base-based-curative or an organic peroxide based-curative. It has been found that while sulfur curatives may be used as curing agents for the curable rubber compounds of the present invention, these compounds tend to have a lower crosslinking efficiency when compared to curable rubber compounds prepared using amine base-based-curative or an organic peroxide based-curatives.

In one or more embodiments, the curable rubber compound of the present invention will comprise a sulfur-based curative, which, optionally, may be in the form of a conventional sulfur curative package. As will be understood by those of skill in the art, the term "sulfur curative package" refers to known combinations of sulfur curatives with various co-agents and other materials useful for curing and controlling the properties of the cured rubber produced, which are usually mixed together when used. In these embodiments, the amount of sulfur-based curative in the curable rubber compound of the present invention will be from about from about 0.1 per hundred rubber (phr) to about 10 (phr). In some embodiments, the amount of sulfur-based curative in the curable rubber compound of the present invention is from about 2 phr to about 10 phr, in other embodiments, from about 3 phr to about 10 phr, in other embodiments, from about 4 phr to about 10 phr, in other embodiments, from about 5 phr to about 10 phr, in other embodiments, from about 6 phr to about 10 phr, in other embodiments, from about 1 phr to about 9 phr, in other embodiments, from about 1 phr to about 8 phr, in other embodiments, from about 1 phr to about 7 phr, and in other embodiments, from about 1 phr to about 6 phr. Here, as well as elsewhere in the specification and claims, individual range values can be combined to form additional non-disclosed ranges.

In some other embodiments, the curable rubber compound of the present invention will comprise an amine or other organic base-based curative, such as triethylenediamine (TED), trimethylamine (TEA), 1,8-Diazabicyclo[5.4.0]undec-7-ene (DBU), or a combination thereof. As set forth above, while these embodiments are described in terms of an amine base, it will be appreciated that other types of organic bases, such as phosphine bases, may be used. In these embodiments, the amount of amine base-based curative in the curable rubber compound of the present invention will be from about from about 0.1 phr to about 20 phr. In some embodiments, the amount of amine base-based curative in the curable rubber compound of the present invention is from about 3 phr to about 20 phr, in other embodiments, from about 6 phr to about 20 phr, in other embodiments, from about 9 phr to about 20 phr, in other embodiments, from about 12 phr to about 20 phr, in other embodiments, from about 15 phr to about 20 phr, in other embodiments, from about 1 phr to about 16 phr, in other embodiments, from about 1 phr to about 12 phr, in other embodiments, from about 1 phr to about 8 phr, and in other embodiments, from about 1 phr to about 4 phr. Here, as well as elsewhere in the specification and claims, individual range values can be combined to form additional non-disclosed ranges.

In some other embodiments, curable rubber compound of the present invention will comprise a phenolic resin curative such as SP 1055 (SI Group (Schenectady, N.Y.)), or a combination thereof. In these embodiments, the amount of phenolic resin curative in the curable rubber compound of the present invention will be from about from about 1 phr to about 20 phr. In these embodiments, the amount of phenolic resin curative in the curable rubber compound of the present invention will be from about from about 0.1 phr to about 20 phr. In some embodiments, the amount of phenolic resin curative in the curable rubber compound of the present invention is from about 3 phr to about 20 phr, in other embodiments, from about 6 phr to about 20 phr, in other embodiments, from about 9 phr to about 20 phr, in other embodiments, from about 12 phr to about 20 phr, in other embodiments, from about 15 phr to about 20 phr, in other embodiments, from about 1 phr to about 16 phr, in other embodiments, from about 1 phr to about 12 phr, in other embodiments, from about 1 phr to about 8 phr, and in other embodiments, from about 1 phr to about 4 phr. Here, as well as elsewhere in the specification and claims, individual range values can be combined to form additional non-disclosed ranges. It has been found that while phenolic resin curatives may be used as curing agents for the curable rubber compounds of the present invention, these compounds tend to have a lower crosslinking efficiency when compared to curable rubber compounds prepared using amine base-based-curative or an organic peroxide based-curatives.

In some other embodiments, the curable rubber compound of the present invention will comprise an organic peroxide-based curative. In various embodiments, suitable, organic peroxide-based curatives may include, but are not limited to, organic peroxides, dialkylperoxides, ketalperoxides, aralkylperoxides, peroxide ethers, peroxide esters, di-tert-butylperoxide, bis-(tert.-butylperoxyisopropyl)-benzene, dicumylperoxide, 2,5-dimethyl-2,5-di(tert.-butylperoxy)-hexane, 2,5-dimethyl-2,5-di(tert-butylperoxy)-hexene-(3), 1,1-bis-(tert.-butylperoxy)-3,3,5-trimethyl-cyclohexane, benzoylperoxide, tert-butylcumylperoxide, tert-butylperbenzoate or a combination thereof. In some embodiments, the peroxide-based curative may comprise dicumyl peroxide (DCP) or benzoyle peroxide (BPO).

In one or more embodiments, the amount of peroxide curative in the compound is from about 0.1 per hundred rubber (phr) to about 10 phr. In some embodiments, the amount of peroxide curative in the compound will be from about 2 phr to about 10 phr, in other embodiments, from about 3 phr to about 10 phr, in other embodiments, from about 4 phr to about 10 phr, in other embodiments, from about 5 phr to about 10 phr, in other embodiments, from about 6 phr to about 10 phr, in other embodiments, from about 1 phr to about 9 phr, in other embodiments, from about 1 phr to about 8 phr, in other embodiments, from about 1 phr to about 7 phr, and in other embodiments, from about 1 phr to about 6 phr. In some embodiments, the amount of peroxide curative in the compound will be from about 4 phr to about 8 phr. Here, as well as elsewhere in the specification and claims, individual range values can be combined to form additional non-disclosed ranges.

In some embodiments, the curable rubber compounds of the present invention will further comprise one or more co-agent. As used herein, the terms "co-agent" and "coagent" are used interchangeably to refer to a compounding ingredient used in relatively small amounts to increase the cross-linking efficiency during curing or to modify the properties of the materials produced. In some of these embodiments, suitable co-agents may include, without limitation, additional curing agents, activators, accelerators, stabilizers, plasticizers, antioxidants, processing oils and fillers. In some embodiments, the co-agent may be a divinylaromatic compound derived from an aromatic compound, such as benzene, naphthalene, phenanthrene, or anthracene, and made diphenyl by replacement of nuclear hydrogen atoms by vinyl or alkyl-substituted vinyl groups. In these coagents, the aromatic nucleus can also be substituted by alkyl groups to form, by way of example, divinyl toluenes and divinyl xylenes, as well as divinyl naphthalene, divinyl pyridine, diisopropenylbenzene and divinylbenzene.

In some other embodiments, the co-agent may be a polyfunctional monomer containing an electron-attractive group. Examples include, without limitation, trimethylolpropane tri(meth)acrylate, polyethylene glycol di(meth)acrylate, ethylene di(methacrylate), ethylene glycol di(meth)acrylate, polyethylene glycol diacrylate, 1.6-hexanediol diacrylate, tetramethylolmethanetetracrylate and polypropylene glycol di(meth)acrylate. In some of these embodiments, the co-agent contains two or more maleimide groups. Non-limiting examples include N,N'-m-phenylenedimaleimide or N,N'-hexamethylenedimaleimide, the structures of which are illustrated below.

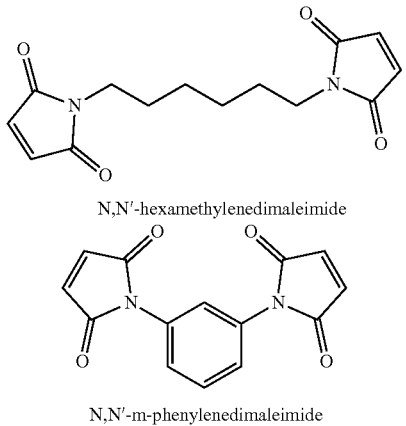

N,N'-hexamethylenedimaleimide

N,N'-m-phenylenedimaleimide

Other non-limiting examples of co-agents may include maleimide, bis-maleimide, tris-maleimide, trimethylolpropane triacrylate, diallylisophthalate, and combinations thereof.

In some embodiments, the total amount of co-agents in the curable rubber compounds of the present invention will be from about from about 0 phr to about 20 phr. In one or more embodiments, the total amount of co-agents in the compound is from about 0.1 per hundred rubber (phr) to about 20 phr. In some embodiments, the total amount of co-agents in the curable rubber compound of the present invention is from about 3 phr to about 20 phr, in other embodiments, from about 6 phr to about 20 phr, in other embodiments, from about 9 phr to about 20 phr, in other embodiments, from about 12 phr to about 20 phr, in other embodiments, from about 15 phr to about 20 phr, in other embodiments, from about 1 phr to about 16 phr, in other embodiments, from about 1 phr to about 12 phr, in other embodiments, from about 1 phr to about 8 phr, and in other embodiments, from about 1 phr to about 4 phr. Here, as well as elsewhere in the specification and claims, individual range values can be combined to form additional non-disclosed ranges.

In one or more embodiments, the curable rubber compound of the present invention will comprise Polymer 3 and triethylenediamine (TED). In some embodiments, the curable rubber compound will comprise Polymer 3 and phenolic resin SP1055. In some embodiments, the curable rubber compound will comprise Polymer 4, dicumyl peroxide (DCP) and N,N'-(1,3-phenylene)dimaleimide (DMI). In some embodiments, the curable rubber compound will comprise Polymer 4, ethyl propiolate grafted 2-methyl-2-butene (referred to herein as "coagent 5"), dicumyl peroxide (DCP) and N,N'-(1,3-Phenylene)dimaleimide (DMI). In some embodiments, the curable rubber compound will comprise Polymer 4 and phenolic resin SP1055. In some embodiments, the curable rubber compound will comprise Polymer 4, dicumyl peroxide (DCP), and trimethylolpropane trimethacrylate (TMPTMA).

In another aspect, the present invention is directed to a method for making the sulfur-curable rubber compound described above. In these embodiments, the method begins with obtaining or preparing a suitable isobutylene-isoprene rubber derivative having two unsaturated bonds and a pendent organic carbonyl group in one or more of its isoprene units, as described above. As set forth above, it has been found that while sulfur curatives may be used as curing agents for the curable rubber compounds of the present invention, these compounds tend to have a lower crosslinking efficiency when compared to curable rubber compounds prepared using amine base-based-curative or an organic peroxide based-curatives. One of ordinary skill in the art will be able to select a suitable isobutylene-isoprene rubber derivative having two unsaturated bonds and a pendent organic carbonyl group in one or more of its isoprene units from those described above without undue experimentation.

Next, a suitable sulfur-based curative or curative package is added to the isobutylene-isoprene rubber derivative and distributed throughout the isobutylene-isoprene rubber derivative by conventional means, including, but not limited to, a two roll mill, extruder, internal mixer, or combination thereof. In one or more embodiments, the sulfur-based curative may be sulfur, tetramethylthiuram disulfide (TMTD), mercaptobenzothiazole (MBT), or a combination thereof. In some embodiments, the sulfur-based curative may be a conventional sulfur-based curative package, including, but not limited to, sulfur with tetramethylthiuram disulfide (TMTD), mercaptobenzothiazole (MBT) as accelerators, and zinc oxide and steric acid as activators.

As will be apparent, one or more co-agents as described above may also be added along with the sulfur based curative. In various embodiments, the total amount of sulfur-based curative and coagents added to the isobutylene-isoprene rubber derivative will be from about 0.1 per hundred rubber (phr) to about 10 (phr). In some embodiments, the total amount of sulfur-based curative and coagents added to the isobutylene-isoprene rubber derivative will be from about 2 phr to about 10 phr, in other embodiments, from about 3 phr to about 10 phr, in other embodiments, from about 4 phr to about 10 phr, in other embodiments, from about 5 phr to about 10 phr, in other embodiments, from about 6 phr to about 10 phr, in other embodiments, from about 1 phr to about 9 phr, in other embodiments, from about 1 phr to about 8 phr, in other embodiments, from about 1 phr to about 7 phr, and in other embodiments, from about 1 phr to about 6 phr. In some embodiments, the total amount of sulfur-based curative and coagents added to isobutylene-isoprene rubber derivative the will be from about 4 phr to about 8 phr. Here, as well as elsewhere in the specification and claims, individual range values can be combined to form additional non-disclosed ranges.

In another aspect, the present invention is directed to a method for making an amine base curable rubber compound comprising the isobutylene-isoprene rubber derivative having two unsaturated bonds and a pendent organic carbonyl group in one or more of its isoprene units, as described above. As set forth above, while these embodiments are described in terms of an amine base, it will be appreciated that other types of organic bases, such as DBU may be used. In these embodiments, an isobutylene-isoprene rubber derivative as described above having desired properties is first selected and obtained or synthesized as set forth herein. In one or more of these embodiments, the isobutylene-isoprene rubber derivative will be Polymer 3, as shown and described above. One of ordinary skill in the art will be able to select a suitable isobutylene-isoprene rubber derivative having two unsaturated bonds and a pendent organic carbonyl group in one or more of its isoprene units from those described above without undue experimentation.

Next, a suitable amine base curative is added to the isobutylene-isoprene rubber derivative and distributed throughout the isobutylene-isoprene rubber derivative by conventional means, including, but not limited to a two roll mill, extruder, internal mixer, or combination thereof. In some embodiments, an organic solvent such as chloroform or hexanes, may be used to assist in the mixing of the curative, and any other materials to be added, into and throughout the isobutylene-isoprene rubber derivative. In one or more embodiments, suitable amine base-based curatives may include, without limitation triethylenediamine (TED), trimethylamine (TEA), or a combination thereof. In some embodiments, the amine base-based curative may also include one or more co-agents as described above.

In various embodiments, the amount of the amine base-based curative added will be from about 0.1 phr to about 30 phr. In some embodiments, the amount of the amine base-based curative added will be from about 0.1 per hundred rubber (phr) to about 30 phr, in other embodiments, from about 5 phr to about 30 phr, in other embodiments, from about 10 phr to about 30 phr, in other embodiments, from about 15 phr to about 30 phr, in other embodiments, from about 20 phr to about 30 phr, in other embodiments, from about 25 phr to about 30 phr, in other embodiments, from about 0.1 phr to about 25 phr, in other embodiments, from about 0.1 phr to about 20 phr, and in other embodiments, from about 0.1 phr to about 15 phr, in other embodiments, from about 0.1 phr to about 10 phr. Here, as well as elsewhere in the specification and claims, individual range values can be combined to form additional non-disclosed ranges.

In one or more embodiments, the method may further comprise adding one or more coagents to the isobutylene-isoprene rubber derivative/amine base mixture. The number and type of coagent added is not particularly limited and suitable coagents may include any of those described above. In some of these embodiments, suitable coagents may include, without limitation, conventional plasticizers, processing oils and conventional fillers, such as, carbon black. In some embodiments, the coagent is added to the isobutylene-isoprene rubber derivative together with the amine base curative, but this need not be the case.

In various embodiments, the total amount of co-agent added will be from about 0.1 phr to about 20 (phr). In some of these embodiments, the total amount of co-agent added will be from about 1 per phr to about 20 phr, in some embodiments, from about 3 phr to about 20 phr, in other embodiments, from about 6 phr to about 20 phr, in other embodiments, from about 9 phr to about 20 phr, in other embodiments, from about 12 phr to about 20 phr, in other embodiments, from about 15 phr to about 20 phr, in other embodiments, from about 1 phr to about 16 phr, in other embodiments, from about 1 phr to about 12 phr, in other embodiments, from about 1 phr to about 8 phr, and in other embodiments, from about 1 phr to about 4 phr. Here, as well as elsewhere in the specification and claims, individual range values can be combined to form additional non-disclosed ranges.

In another aspect, the present invention is directed to a method for making the peroxide curable rubber compound comprising the isobutylene-isoprene rubber derivative, as described above. In these embodiments, a suitable isobutylene-isoprene rubber derivative having two unsaturated bonds and a pendent organic carbonyl group in one or more of its isoprene units, as described above, is first selected and obtained or synthesized as set forth herein. In one or more of these embodiments, the isobutylene-isoprene rubber derivative used will be Polymer 4, as shown and described above. One of ordinary skill in the art will be able to select a suitable isobutylene-isoprene rubber derivative having two unsaturated bonds and a pendent organic carbonyl group in one or more of its isoprene units from those described above without undue experimentation.

Next, a suitable peroxide curative is added to the isobutylene-isoprene rubber derivative and distributed throughout the isobutylene-isoprene rubber derivative by conventional means, including, but not limited to a two roll mill, extruder, internal mixer, or combination thereof. In some embodiments, an organic solvent, such as chloroform or hexane, may be used to assist in the mixing of the curative and any other materials to added, into and throughout the isobutylene-isoprene rubber derivative. In various embodiments, the peroxide curative may any of those described above. One of ordinary skill in the art will be able to select a suitable peroxide curative from those described above without undue experimentation. In one or more embodiments, suitable amine base-based curatives may be dicumyl peroxide (DCP), benzoyle peroxide (BPO), or a combination thereof.

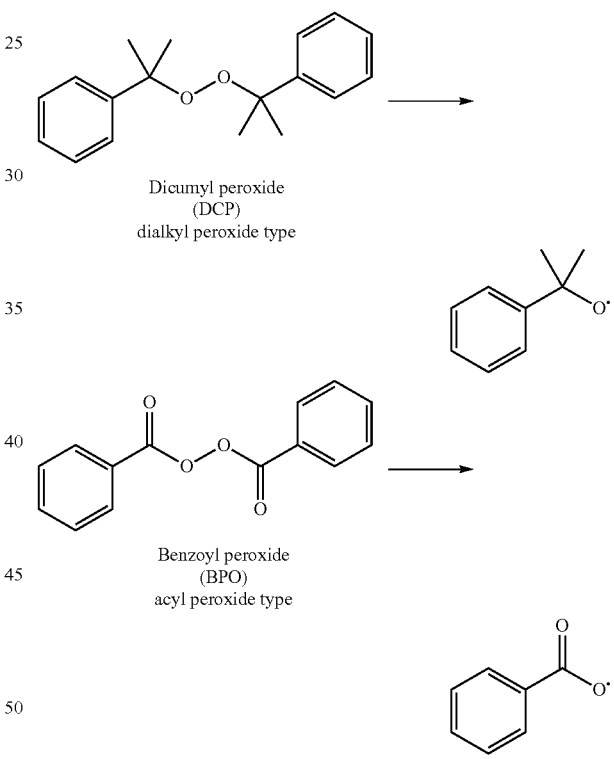

Dicumyl peroxide
(DCP)
dialkyl peroxide type

Benzoyl peroxide
(BPO)
acyl peroxide type

In one or more embodiments, the amount of peroxide curative added to the isobutylene-isoprene rubber derivative described above is in the range of from about 0.1 per hundred rubber (phr) to about 10 phr. In some embodiments, the amount of peroxide curative added to the isobutylene-isoprene rubber derivative described above will be in the range of from about 1 phr to about 10 phr, in other embodiments, from about 2 phr to about 10 phr, in other embodiments, from about 3 phr to about 10 phr, in other embodiments, from about 4 phr to about 10 phr, in other embodiments, from about 5 phr to about 10 phr, in other embodiments, from about 0.1 phr to about 9 phr, in other embodiments, from about 0.1 phr to about 8 phr, in other embodiments, from about 0.1 phr to about 7 phr, and in other embodiments, from about 0.1 phr to about 6 phr. In some embodiments, the amount of peroxide curative in the compound will be from about 4 phr to about 8 phr. Here, as well as elsewhere in the specification and claims, individual range values can be combined to form additional non-disclosed ranges.

In one or more embodiments, the method may further comprise adding one or more coagents to the isobutylene-isoprene rubber derivative/amine base mixture. The number and type of coagent added is not particularly limited and suitable coagents may include any of those described above. In some of these embodiments, suitable coagents may include, without limitation, plasticizers, processing oils and/or fillers. In some embodiments, the coagent is added to the isobutylene-isoprene rubber derivative together with the peroxide curative, but this need not be the case.

In various embodiments, the total amount of co-agent added will be from about 0.1 per hundred rubber (phr) to about 20 (phr). In some embodiments, the total amount of co-agent added will be from about 1 per phr to about 20 phr, in some embodiments, from about 3 phr to about 20 phr, in other embodiments, from about 6 phr to about 20 phr, in other embodiments, from about 9 phr to about 20 phr, in other embodiments, from about 12 phr to about 20 phr, in other embodiments, from about 15 phr to about 20 phr, in other embodiments, from about 1 phr to about 16 phr, in other embodiments, from about 1 phr to about 12 phr, in other embodiments, from about 1 phr to about 8 phr, and in other embodiments, from about 1 phr to about 4 phr. Here, as well as elsewhere in the specification and claims, individual range values can be combined to form additional non-disclosed ranges.

In another aspect, the present invention is directed to cured butyl rubber compounds comprising the isobutylene-isoprene rubber derivative described above. In some embodiments, the present invention is directed to a sulfur-cured butyl rubber compound comprising one or more of the sulfur-curable rubber compound described above. In these embodiments, the sulfur-curable rubber compound described above is cured by heating it to a temperature of from about 80° C. to about 200° C. for 0.1 h to 10 hours to produce a fully cured butyl rubber compound. In some embodiments, the compound may be heated to a temperature of from about 110° C. to about 160° C., in other embodiments, from about 120° C. to about 160° C., in other embodiments, from about 130° C. to about 160° C., in other embodiments, from about 140° C. to about 160° C., in other embodiments, from about 100° C. to about 155° C., in other embodiments, from about 100° C. to about 150° C., and in other embodiments, from about 100° C. to about 140° C. Here, as well as elsewhere in the specification and claims, individual range values can be combined to form additional non-disclosed ranges.

In other embodiments, the present invention is directed to an amine base-cured butyl rubber compound comprising the amine base curable rubber compound comprising the isobutylene-isoprene rubber derivative having two unsaturated bonds and a pendent organic carbonyl group in one or more of its isoprene units, as described above. In these embodiments, the amine base curable rubber compound is cured at a temperature of from about room temperature to about 160° C. to produce an amine-base cured rubber compound having excellent mechanical properties. In some embodiments, the amine base curable rubber compound may be heated to a temperature of from about 110° C. to about 160° C., in other embodiments, from about 120° C. to about 160° C., in other embodiments, from about 130° C. to about 160° C., in other embodiments, from about 140° C. to about 160° C., in other embodiments, from about 100° C. to about 155° C., in other embodiments, from about 100° C. to about 150° C., and in other embodiments, from about 100° C. to about 140° C. Here, as well as elsewhere in the specification and claims, individual range values can be combined to form additional non-disclosed ranges.

It has been found that amine base-cured butyl rubber compound according to various embodiments of the present invention have mechanical properties, including tensile strength, toughness, and elongation, that are as good as, or better than a comparable sulfur cured isobutylene isoprene rubber. As used herein, the term "tensile strength" refers to the maximum stress that a material being elongated can withstand before breaking, as measured by a tensometer. An amine base-cured butyl rubber compound according to various embodiments of the present invention will be understood to have a tensile strength that is as good as or better than another cured isobutylene isoprene rubber if the measured maximum stress upon elongation for that amine base-cured butyl rubber compound is the same as or greater than that of the cured isobutylene isoprene rubber to which it is being compared.

As used herein, the "toughness" of a cured rubber compound refers to the ability of the cured rubber compound to absorb energy and plastically deform without fracturing, as measured by a tensometer. As will be appreciated, the toughness may be calculated by integrating the stress-strain curve generated based upon tensometer measurements for the materials being tested. An amine base-cured butyl rubber compound according to various embodiments of the present invention will be understood to have a toughness that is as good as or better than another cured isobutylene isoprene rubber if the toughness value, generated as set forth above, is the same as or greater than that of the cured isobutylene isoprene rubber to which it is being compared. The term "elongation" as used herein with respect to cured rubber compounds, refers to the strain at breaking for a material under a load tending to elongate the cured rubber compound, as measured by tensometer. An amine base-cured butyl rubber compound according to various embodiments of the present invention will be understood to have an elongation that is as good as or better than another cured isobutylene isoprene rubber if the measured strain at breaking is the same as or greater than that of the cured isobutylene isoprene rubber to which it is being compared. Finally, a conventional sulfur cured isobutylene isoprene rubber will be understood to be "comparable" to an amine base-cured butyl rubber compound according to the present invention if it has a comparable weight average molecular weight (within about 5%). As set forth above, the amine base-cured butyl rubber compounds of the present invention are crosslinked using carbon-carbon bonds which are known to be much more stable than the sulfur-sulfur bonds used to crosslink conventional sulfur cured isobutylene isoprene rubber.

In one or more embodiments, the present invention is directed to a peroxide-cured butyl rubber compound comprising the peroxide curable rubber compound comprising the isobutylene-isoprene rubber derivative, as described above. In these embodiments, a peroxide-cured butyl rubber compound having excellent mechanical properties is formed by curing the peroxide curable rubber compound described above by heating it to a temperature of from 100° C. to 200° C. In some embodiments, the amine base curable rubber compound may be heated to a temperature of from about 110° C. to about 200° C., in other embodiments, from about 120° C. to about 200° C., in other embodiments, from about 130° C. to about 200° C., in other embodiments, from about 140° C. to about 200° C., in other embodiments, from about 100° C. to about 180° C., in other embodiments, from about 100° C. to about 170° C., and in other embodiments, from about 100° C. to about 160° C. for curing. In some embodiments, the amine base curable rubber compound may be heated to a temperature of from about 130° C. to about 180° C. for curing. Here, as well as elsewhere in the specification and claims, individual range values can be combined to form additional non-disclosed ranges.

It has been found that peroxide base-cured butyl rubber compound according to various embodiments of the present invention have mechanical properties, including tensile strength, elongation, and toughness, that are as good as, or better than conventional sulfur cured isobutylene isoprene rubber, as defined above with respect to organic base-cured isobutylene isoprene rubber. In addition, it is believed that the peroxide-cured butyl rubber compounds of the present invention have carbon-carbon bonds which are known to be much more stable than the sulfur-sulfur bonds used to crosslink conventional sulfur cured isobutylene isoprene rubber.

EXPERIMENTAL

To evaluate and further reduce the present invention to practice, various butyl rubber compounds were made using Polymers 1-4 and then evaluated. In a series of experiments outlined below, the curing characteristics, mechanical properties, gel fraction and crosslinking density of these different compounds were tested and evaluated. For reference, the general structures of Polymers 1-4 are shown below.

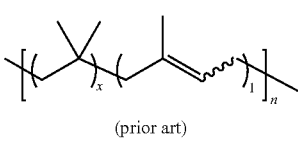

Polymer 1

(prior art)

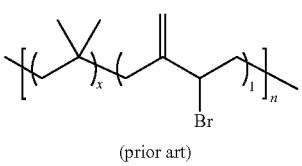

Polymer 2

(prior art)

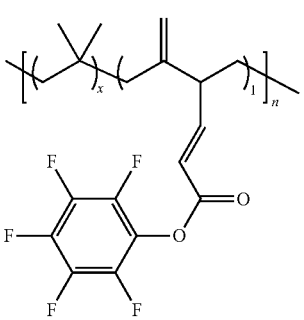

Polymer 3

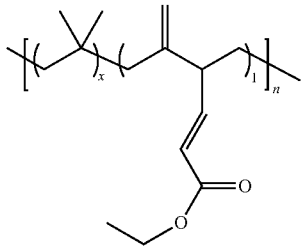

Polymer 4

It should be appreciated, however, that for these experiments and the examples that follow, Polymers 1, 3 and 4 are all based upon Exxon Butyl 268S (ExxonMobil Chemical Company, (Spring, Tex.)) and Polymer 2 is based upon Exxon Bromobutyl rubber 2222 (ExxonMobil Chemical Company, (Spring, Tex.)) which will serve to define their general size (x and n values in the above formulas).

Compounding of Polymer 1 with Sulfur-Based Curatives

Polymer 1 was compounded with sulfur, tetramethylthiuram disulfide (TMTD), mercaptobenzothiazole (MBT), zinc oxide and stearic acid, according to the recipe set forth in Table 1, below and heated to 160° C. for vulcanization. See Example 5.

TABLE 1

Recipes for Sulfur Vulcanization of Polymer 1.

| Compound | Polymer 1 | Sulfur | TMTD | MBT | ZnO | Steric Acid |
|---|---|---|---|---|---|---|
| 1a | 100 g | 2 g | 1 g | 0.5 g | 5 g | 1 g |

Compounding of Polymer 2 with N,N'-(1,3-Phenylene)dimaleimide (DMI)

Polymer 2 was compounded with varying amounts of dicumyl peroxide (DCP) and N,N'-(1,3-Phenylene)dimaleimide (DMI). Compounds 2a-2e were formed by compounding Polymer 2 with DCP and DMI according to the recipes set forth in Table 2, below and heated to 160° C. for vulcanization. See Example 6.

TABLE 2

Recipes for compounds 2a-2e.

| Compound | Polymer 2 | DCP | DMI |
|---|---|---|---|
| 2a | 100 g | 0.3 g, 0.011 mmol/g | 5 g, 0.26 mmol/g |
| 2b | 100 g | 0.3 g, 0.011 mmol/g | 14 g, 0.52 mmol/g |
| 2c | 100 g | 2 g, 0.074 mmol/g | 2.5 g, 0.13 mmol/g |
| 2d | 100 g | 2 g, 0.074 mmol/g | 5 g, 0.26 mmol/g |
| 2e | 100 g | 2 g, 0.074 mmol/g | 14 g, 0.52 mmol/g |

Compounding of Polymer 3 with TED by Using a Two-Roll Mill

Polymer 3 was compounded with varying amounts of triethylenediamine (TED) according to the recipes set forth in Table 3, below and vulcanized in a hydraulic press at 25° C. (Compound 3a-3e), 60° C. (Compound 3a-3e), 120° C. (Compound 3a-3e), 140° C. (Compound 3a-3e) or 160° C. (Compound 3a-3e) to form Compounds 3a-3e. See Example 7.

TABLE 3

Recipes for compounds 3a-3e.

| Compound | Polymer 3 | TED | Equivalent of TED with respect to 1eq C=C in compound |
|---|---|---|---|
| 3a | 100 g | 0.96 g, 85.5 umol/g | 0.15 eq |
| 3b | 100 g | 1.92 g, 171 umol/g | 0.3 eq |
| 3c | 100 g | 3.84 g, 342 umol/g | 0.6 eq |
| 3d | 100 g | 9.6 g, 855 umol/g | 1.5 eq |
| 3e | 100 g | 19.2 g, 1.71 mmol/g | 3 eq |

Compounding of Polymer 4 with DMI by Using a Two-Roll Mill

Polymer 4 was compounded with varying amounts of DCP and DMI according to the recipes set forth in Table 4, below and vulcanized in a hydraulic press at 160° C. to form Compounds 4a-4m. See Example 8.

TABLE 4

Recipes for compounds 4a-4m.

| Compound | Polymer 4 | DCP | DMI |
|---|---|---|---|
| 4a | 100 g | 0.1 g, 3.7 umol/g | 2.8 g, 0.104 mmol/g |
| 4b | 100 g | 0.1 g, 3.7 umol/g | 6.97 g, 0.26 mmol/g |
| 4c | 100 g | 0.1 g, 3.7 umol/g | 13.93 g, 0.52 mmol/g |
| 4d | 100 g | 0.2 g, 7.4 umol/g | 3.49 g, 0.13 mmol/g |
| 4e | 100 g | 0.2 g, 7.4 umol/g | 5.58 g, 0.208 mmol/g |
| 4f | 100 g | 0.2 g, 7.4 umol/g | 11.17 g, 0.416 mmol/g |
| 4g | 100 g | 0.2 g, 7.4 umol/g | 13.93 g, 0.52 mmol/g |
| 4h | 100 g | 0.3 g, 11 umol/g | 3.49 g, 0.13 mmol/g |
| 4i | 100 g | 0.3 g, 11 umol/g | 6.97 g, 0.26 mmol/g |
| 4j | 100 g | 0.3 g, 11 umol/g | 13.93 g, 0.52 mmol/g |
| 4k | 100 g | 0.5 g, 18.3 umol/g | 3.49 g, 0.13 mmol/g |
| 4l | 100 g | 0.5 g, 18.3 umol/g | 6.97 g, 0.26 mmol/g |
| 4m | 100 g | 0.5 g, 18.3 umol/g | 13.93 g, 0.52 mmol/g |

Compounding of Polymer 4 with Ethyl Propiolate Grafted 2-methyl-2-butene (Coagent 5) and DMI Polymer 4 was compounded with varying amounts of ethyl propiolate grafted 2-methyl-2-butene (coagent 5), DCP, and DMI according to the recipes set forth in Table 5, below and vulcanized in a hydraulic press at 160° C. to form Compounds 4n-4q. See Example 9.

TABLE 5

Recipes for compounds 4n-4q.

| Compound | Polymer 4 | Coagent 5 | DCP | DMI |
|---|---|---|---|---|
| 4n | 100 g | 1.68 g | 0.2 g, 7.4 umol/g | 3.49 g, 0.13 mmol/g |
| 4o | 100 g | 0.85 g | 0.3 g, 11 umol/g | 3.49 g, 0.13 mmol/g |
| 4p | 100 g | 1.68 g | 0.3 g, 11 umol/g | 3.49 g, 0.13 mmol/g |
| 4q | 100 g | 1.68 g | 0.5 g, 18.3 umol/g | 3.49 g, 0.13 mmol/g |

Compounding of Polymer 4 with Trimethylolpropane Trimethacrylate (TMPTMA)

Polymer 4 was compounded with varying amounts of DCP and Trimethylolpropane trimethacrylate (TMPTMA) according to the recipes set forth in Table 6, below and vulcanized in a hydraulic press at 160° C. to form Compounds 4r-4u. See Example 10.

TABLE 6

Recipes for compounds 4r-4u.

| Compound | Polymer 4 | DCP | TMPTMA |
|---|---|---|---|
| 4r | 100 g | 0.2 g, 7.4 umol/g | 14.12 g, 0.42 mmol/g |
| 4s | 100 g | 0.6 g, 22.2 umol/g | 14.12 g, 0.42 mmol/g |
| 4t | 100 g | 1 g, 37 umol/g | 14.12 g, 0.42 mmol/g |
| 4u | 100 g | 1.4 g, 51.8 umol/g | 14.12 g, 0.42 mmol/g |

Swelling Tests

Swelling tests were conducted (see, Example 11) and the gel fraction and crosslinking density of all compounds were calculated using equations 1 and 2, which are shown below.

$$W_{gel} = \frac{M_{dry}}{M_o} \times 100\% \qquad \text{Eq. 1}$$

$W_{gel}$ is the gel fraction;
$M_{dry}$ is the weight of dry sample; and
$M_o$ is the weight of rubber in original sample $$\text{In } (1 - \varphi_r) + \varphi_r + \chi \varphi_r^2 = -\rho_{cx} V_s \left( \varphi_r^{1/3} - \frac{2\varphi_r}{f} \right) \qquad \text{Eq. 2}$$

$\varphi_r$ is volume fraction of rubber;
$\chi$ is polymer-solvent interaction parameter, 0.516 is used here;
$V_s$ is molar volume of solvent, 130.8 cm$^3$/mole;
$f$ is functionality of crosslinks, 4 is used here; and
$\rho_{cx}$ is crosslinking density in compounds, mole/cm$^3$ Mechanical Studies Tensile testing was performed on an Instron Model 5567 equipped with a 1000 N load cell and stiffness testing was performed using a Moving Die Rheometer (MDR) 2000. See Example 12, below.

Results and Discussion

Curing Characteristics

The curing curves for Compounds 1a, 2a-2e, 3b-3e, 4a-4m, and 4o-4s are shown in FIGS. 4-7 and the important curing characteristics of these compounds are summarized in Table 7. As shown in FIGS. 4-7, all compounds are effectively crosslinked except compounds 4k, 4s, where it is believed that significant chain scission occurred because of the relatively large quantity of peroxide that was added into compounds.

TABLE 7

Summary of curing characteristics of compounds.

| Compound | $t_{10}$ (min) | $t_{90}$ (min) | $M_L$ (dNm) | $M_H$ (dNm) | $\Delta M$ ($M_H$-$M_L$) (dNm) |
|---|---|---|---|---|---|
| 1a | 3.55 | 20.36 | 1.14 | 5.36 | 4.22 |
| 2a | 0.50 | 1.97 | 0.60 | 4.51 | 3.91 |
| 2b | 0.57 | 2.31 | 0.67 | 9.52 | 8.85 |
| 2c | 1.05 | 6.01 | 0.96 | 4.15 | 3.19 |
| 2d | 1.28 | 10.49 | 0.98 | 6.54 | 5.56 |
| 2e | 1.26 | 16.81 | 1.08 | 10.42 | 9.34 |
| 3b-140° C. | 1.4 | 124.71 | 0.95 | 1.88 | 0.93 |
| 3c-140° C. | 1.35 | 52.03 | 0.85 | 1.80 | 0.95 |
| 3d-140° C. | 1.31 | 48.8 | 0.63 | 1.47 | 0.84 |
| 3e-140° C. | 1.05 | 44.79 | 0.50 | 0.96 | 0.46 |
| 3b-160° C. | 0.95 | 56.70 | 0.89 | 1.75 | 0.86 |
| 3c-160° C. | 0.82 | 29.56 | 0.94 | 1.91 | 0.97 |
| 3d-160° C. | 0.72 | 18.32 | 0.82 | 1.67 | 0.85 |
| 3e-160° C. | 0.47 | 4.83 | 0.69 | 0.99 | 0.3 |
| 4a | 4.40 | 40.38 | 0.88 | 1.05 | 0.17 |
| 4b | 4.44 | 36.29 | 0.97 | 1.64 | 0.67 |
| 4c | 4.53 | 35.68 | 1.08 | 2.43 | 1.35 |

TABLE 7-continued

Summary of curing characteristics of compounds.

| Compound | $t_{10}$ (min) | $t_{90}$ (min) | $M_L$ (dNm) | $M_H$ (dNm) | $\Delta M$ ($M_H$-$M_L$) (dNm) |
|---|---|---|---|---|---|
| 4d | 3.99 | 25.90 | 0.89 | 2.16 | 1.27 |
| 4e | 3.85 | 28.47 | 0.92 | 2.67 | 1.75 |
| 4f | 3.81 | 31.32 | 1.06 | 3.37 | 2.31 |
| 4g | 4.12 | 33.08 | 1.10 | 3.60 | 2.5 |
| 4h | 2.45 | 10.52 | 0.84 | 2.03 | 1.19 |
| 4i | 2.64 | 13.88 | 0.89 | 2.72 | 1.83 |
| 4j | 3.09 | 24.71 | 1.06 | 4.91 | 3.85 |
| 4k | 1.83 | 6.44 | 0.82 | 1.95 | 1.13 |
| 4l | 2.57 | 15.94 | 0.82 | 2.69 | 1.87 |
| 4m | 3.06 | 21.85 | 0.98 | 4.93 | 3.95 |
| 4o | 3.20 | 22.86 | 0.88 | 2.28 | 1.4 |
| 4p | 3.47 | 28.27 | 0.83 | 2 | 1.17 |
| 4r | 0.89 | 3.49 | 0.46 | 1.15 | 0.69 |
| 4s | 0.64 | 2 | 0.59 | 1.42 | 0.83 |

$M_H$ maximum torque.
$M_L$ minimum torque.

Mechanical Properties of Compounds 1a, 2a-2e and 4a-4t

Figure 8:
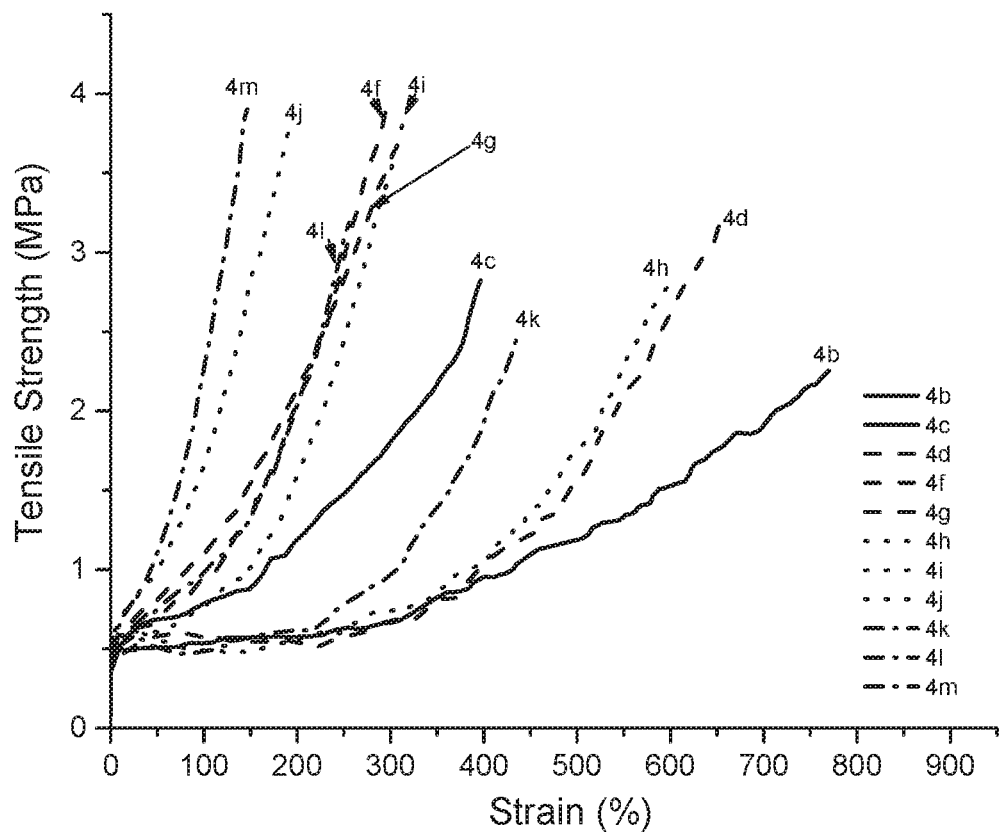
FIG. 8 is a graph showing stress-strain curves for compounds 4b-4m.
Figure 9:
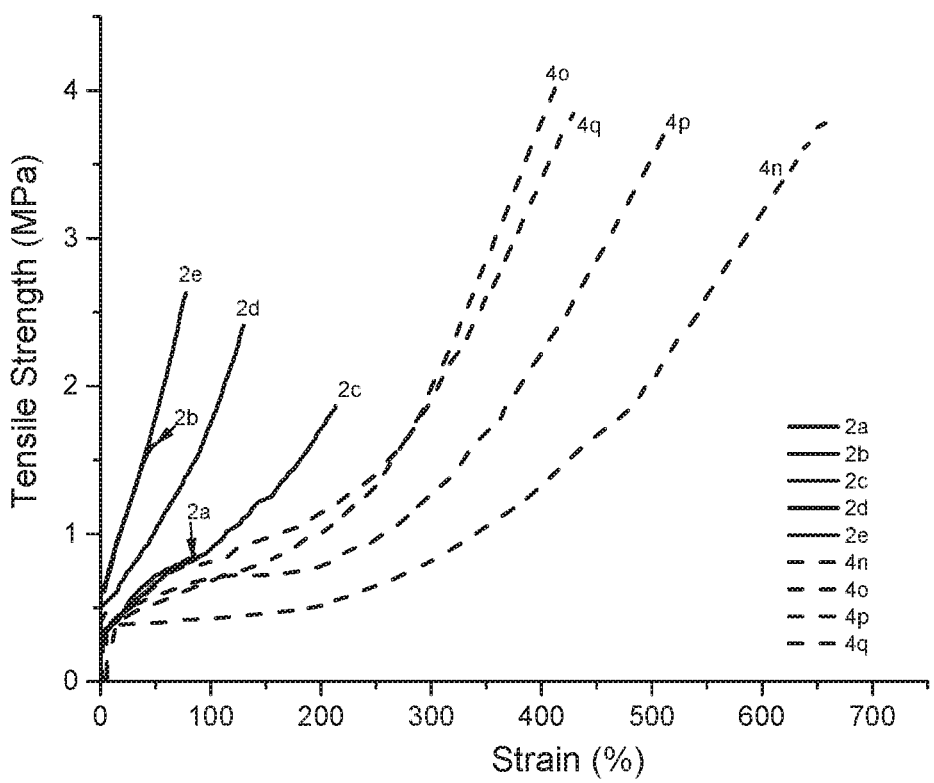
FIG. 9 is a graph showing stress-strain curves for compounds 2a-2e and 4n-4q.
Figure 10:
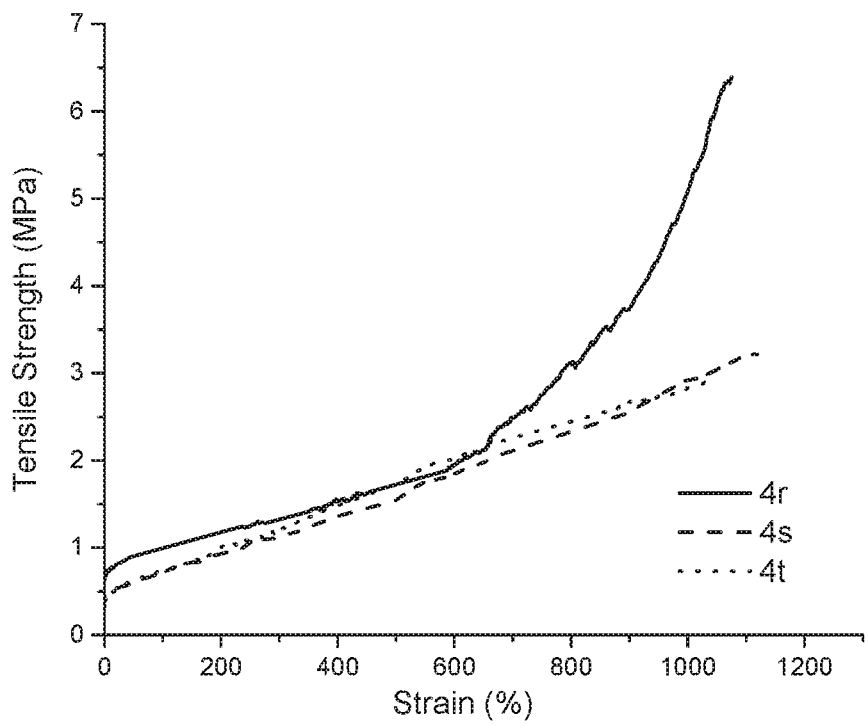
FIG. 10 is a graph showing stress-strain curves for compounds 4r-4t.

Stress-strain curves of compounds 1a, 2a-2e and 4a-4t are shown in FIGS. 8-13. The key parameters are summarized in Table 8. For compound 4a, it exceeded the upper limit of instrument since it is too stretchy. The difference between 2a and 2d or 2b and 2e in Table 2 is DCP loading. Compared to 2d and 2e in FIG. 9, it shows compounds 2a, 2b are probably under-crosslinking. The difference among 4b, 4i and 4l or 4g, 4j and 4m in Table 4 is the amount of DCP, the curves of 4b, 4i and 4l or 4c, 4g, 4j and 4m in FIG. 8 indicate 4b and 4c is probably also under-crosslinking. The under-crosslinking of compounds 2a, 2b, 4b and 4c is probably due to addition of small amount of peroxide. When peroxide loading is constant, the amount of coagent is changed, such as compounds 4d-4g, 4h-4j or 4k-4m, compounds 4d, 4h, 4k in FIG. 8 are probably under-crosslinking, it is probably because small amount of coagent is added in compound. For compounds 4r-4t in Table 6, TMPTMA has the propensity of homo-polymerization, it prevents peroxide to form network in compounds 4r-4t, which causes under-crosslinking of compounds 4r-4t.

Figure 11:
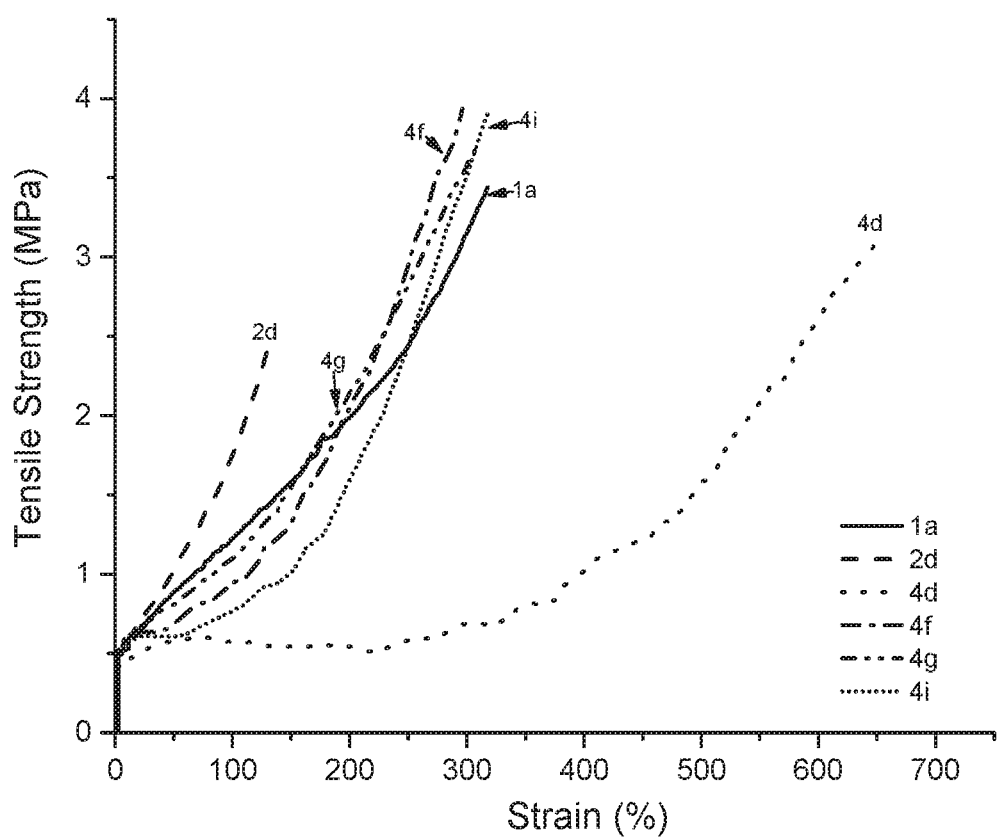
FIG. 11 is a graph showing stress-strain curves for compounds 1a, 2d, 4d, 4f, 4g and 4i.
Figure 12:
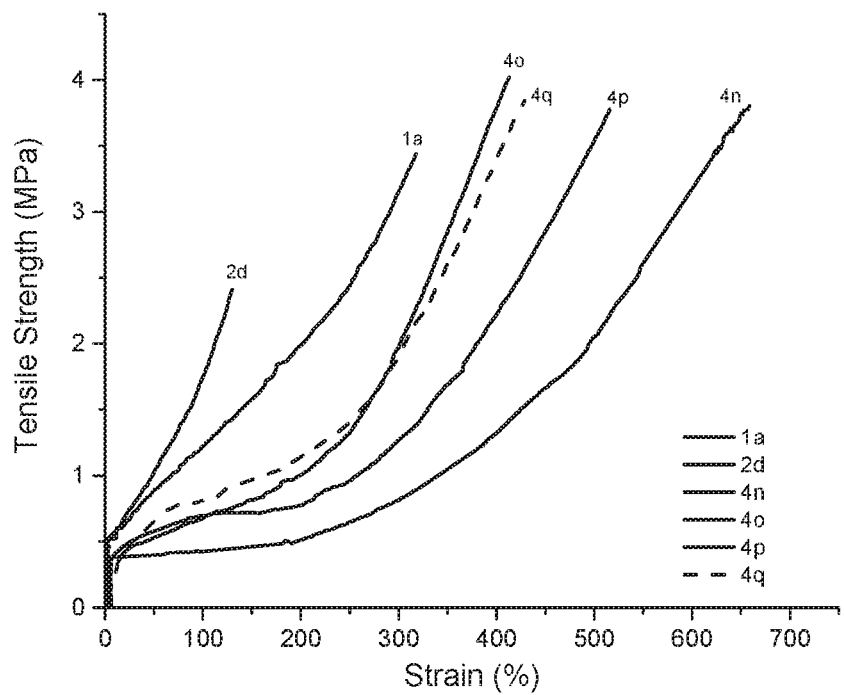
FIG. 12 is a graph showing stress-strain curves for compounds 1a, 2d and 4n-4q.
Figure 13:
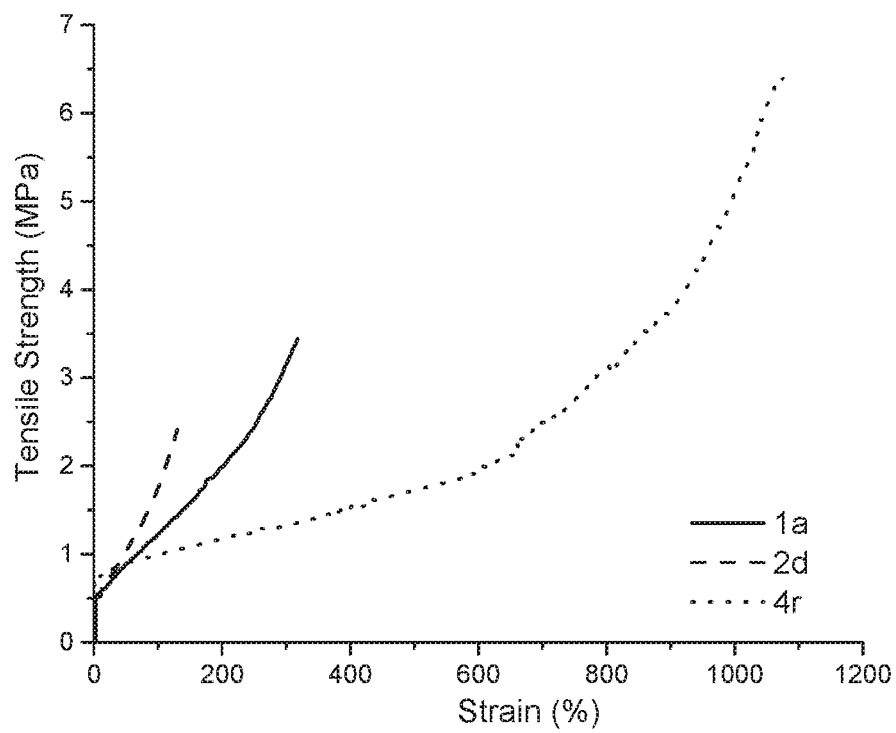
FIG. 13 is a graph showing stress-strain curves for compounds 1a, 2d and 4r.

As can be seen from FIG. 11, the mechanical properties (tensile strength, strain at break and toughness) of compounds 4f, 4g, 4i are comparable to compound 1a, which was crosslinked by sulfur and much better than compound 2d, which was crosslinked by peroxide. As shown in FIG. 12, the mechanical properties (tensile strength, strain at break and toughness) of 4n, 4o, 4p and 4q are better than compounds 1a and 2d. To compounds 4n, 4o, 4p and 4q in Table 5, coagent ethyl propiolate grafted 2-methyl-2-butene (coagent 5) was added. Coagent ethyl propiolate grafted 2-methyl-2-butene (coagent 5) has same structure with the reactive sites in polymer chain, but has higher mobility within the compound, which was expected to improve crosslinking efficiency. Moreover, it was expected that ethyl propiolate grafted 2-methyl-2-butene (coagent 5) would probably to decrease chain scission in these compounds, since it is much easier for a radical to react with ethyl propiolate grafted 2-methyl-2-butene (coagent 5) than with the isobutylene unit in polymer chain. As can be seen in FIG. 13, the toughness of 4r was found to be much higher than 1a and 2d.

TABLE 8

Summary of Mechanical Properties of Compounds 1a, 2a-2e and 4a-4t.

| Compound | $\sigma_{100\%}$ (MPa) | $\sigma_{200\%}$ (MPa) | $\varepsilon_b$ (%) | $\sigma_b$ (MPa) | Toughness ($10^6$ J/m$^3$) |
|---|---|---|---|---|---|
| 1a | 1.19 ± 0.09 | 1.84 ± 0.14 | 321 ± 29 | 3.22 ± 0.49 | 5.26 ± 0.90 |
| 2a | N | N | 77 ± 14 | 0.82 ± 0.06 | 0.47 ± 0.11 |
| 2b | N | N | 42 ± 6 | 1.57 ± 0.19 | 0.48 ± 0.09 |
| 2c | 0.93 ± 0.1 | 1.71 ± 0.22 | 220 ± 27 | 2 ± 0.16 | 2.32 ± 0.32 |
| 2d | 1.69 ± 0.2 | N | 133 ± 21 | 2.34 ± 0.16 | 1.65 ± 0.27 |
| 2e | N | N | 79 ± 10 | 2.53 ± 0.3 | 1.17 ± 0.23 |
| 4a | 0.66 ± 0.03 | 0.75 ± 0.06 | N | N | N |
| 4b | 0.61 ± 0.07 | 0.69 ± 0.21 | 776 ± 56 | 2.35 ± 0.16 | 8.84 ± 0.63 |
| 4c | 0.77 ± 0.05 | 1.19 ± 0.07 | 391 ± 55 | 2.7 ± 0.44 | 5.22 ± 1.39 |
| 4d | 0.52 ± 0.11 | 0.62 ± 0.16 | 649 ± 47 | 3.21 ± 0.36 | 7.65 ± 0.83 |
| 4f | 1.04 ± 0.07 | 2.19 ± 0.11 | 299 ± 31 | 4.00 ± 0.59 | 5.46 ± 1.21 |
| 4g | 1.10 ± 0.01 | 2.41 ± 0.03 | 303 ± 5 | 3.60 ± 0.1 | 5.33 ± 0.19 |
| 4h | 0.49 ± 0.09 | 0.6 ± 0.04 | 608 ± 20 | 3.15 ± 0.32 | 7.06 ± 1.00 |
| 4i | 0.79 ± 0.10 | 1.55 ± 0.14 | 324 ± 6 | 3.94 ± 0.35 | 5.02 ± 0.60 |
| 4j | 1.61 ± 0.05 | N | 196 ± 18 | 3.78 ± 0.30 | 3.60 ± 0.62 |
| 4k | 0.52 ± 0.05 | 0.61 ± 0.06 | 454 ± 13 | 2.86 ± 0.50 | 4.52 ± 0.45 |
| 4l | 0.92 ± 0.12 | 1.97 ± 0.36 | 261 ± 14 | 3.41 ± 0.38 | 3.68 ± 0.53 |
| 4m | 2.31 ± 0.14 | N | 149 ± 10 | 4.01 ± 0.37 | 2.82 ± 0.41 |
| 4n | 0.46 ± 0.05 | 0.50 ± 0.03 | 675 ± 42 | 3.77 ± 0.31 | 8.74 ± 1.85 |
| 4o | 0.74 ± 0.05 | 1.05 ± 0.1 | 407 ± 26 | 3.9 ± 0.17 | 6.01 ± 0.28 |
| 4p | 0.66 ± 0.05 | 0.80 ± 0.04 | 501 ± 33 | 3.61 ± 0.31 | 6.95 ± 0.95 |
| 4q | 0.75 ± 0.12 | 1.05 ± 0.24 | 415 ± 29 | 3.93 ± 0.29 | 6.23 ± 0.80 |
| 4r | 0.90 ± 0.09 | 1.11 ± 0.11 | 1120 ± 63 | 7.26 ± 2.37 | 28.38 ± 6.42 |
| 4s | 0.72 ± 0.01 | 0.89 ± 0.11 | 1134 ± 23 | 3.26 ± 0.12 | 20.11 ± 0.77 |
| 4t | 0.73 ± 0.00 | 0.99 ± 0.01 | 1113 ± 2 | 2.85 ± 0.01 | 20.31 ± 0.42 |

($\sigma_{100\%}$, $\sigma_{300\%}$ are stress at 100%, 300% strain, respectively. $\varepsilon_b$ is strain at break. $\sigma_b$ is tensile strength of sample. N means no data.)

Mechanical Properties of Triethylenediamine-Crosslinked Compounds 3b-3e

Figure 14:
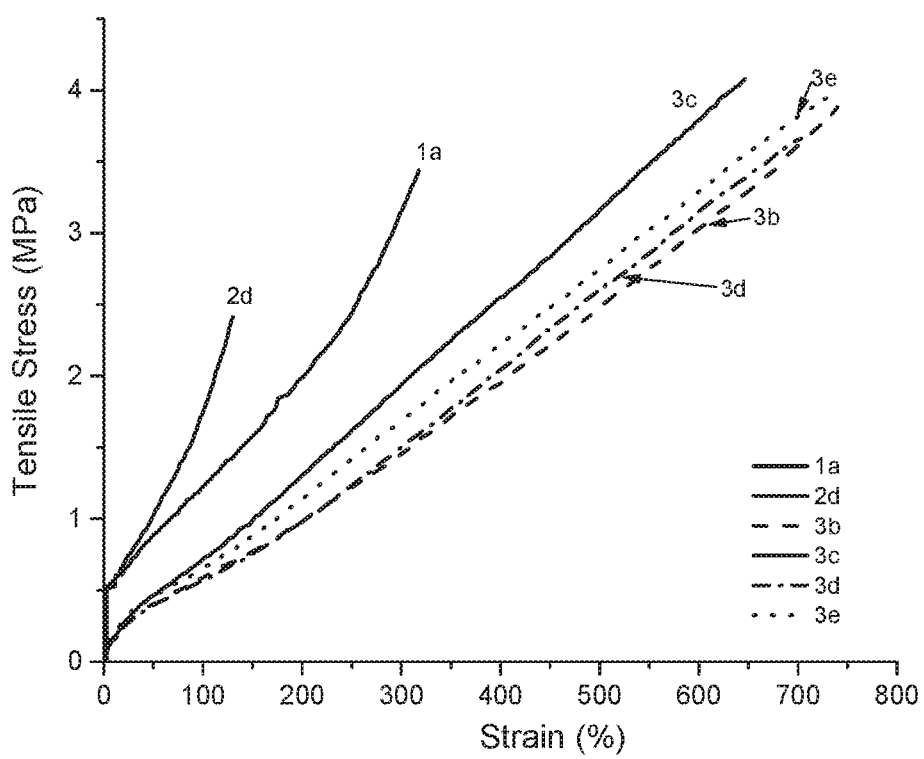
FIG. 14 is a graph showing stress-strain curves for TED-Crosslinked compounds 3b-3e at 140° C. for 2 hours.

The mechanical properties of TED-crosslinked compounds 3b-3e are summarized in Table 9. Compound 3a could not be crosslinked by TED, probably due to the low concentration of TED in compound. As shown in FIG. 14, $\sigma_{100\%}$ and $\sigma_{200\%}$ of compounds was increased from 3b to 3c, which is probably due to more crosslinking happening in compounds 3c. The decrease of $\sigma_{100\%}$, and $\sigma_{200\%}$ from 3c to 3d or 3e was likely because of high TED loading, where TED acts like plasticizer.

TABLE 9

Summary of Mechanical Properties of TED-crosslinked compounds 3b-3e.

| Compound | $\sigma_{100\%}$ (MPa) | $\sigma_{200\%}$ (MPa) | $\varepsilon_b$ (%) | $\sigma_b$ (MPa) | Toughness ($10^6$ J/m$^3$) |
|---|---|---|---|---|---|
| 3b | 0.59 ± 0.03 | 1.03 ± 0.03 | 722 ± 56 | 3.95 ± 0.64 | 14.1 ± 3.27 |
| 3c | 0.72 ± 0.03 | 1.30 ± 0.10 | 656 ± 50 | 4.07 ± 0.22 | 13.87 ± 1.54 |
| 3d | 0.57 ± 0.06 | 0.99 ± 0.14 | 736 ± 51 | 3.83 ± 0.43 | 13.97 ± 1.90 |
| 3e | 0.66 ± 0.03 | 1.17 ± 0.09 | 687 ± 71 | 3.91 ± 0.16 | 13.84 ± 1.79 |

Gel Fraction and Crosslinking Densities of Compounds 1a and 4a-4q

The gel fraction and crosslinking density of compounds were measured by a swelling test. The results are shown in Table 10. As can be seen, compounds 4a-4c have lowest gel fraction and crosslinking densities, likely due to the relatively small amount of peroxide added to the compound. Compound 4m was found to have the highest gel fraction and crosslinking density, followed by compound 4j.

TABLE 10

Summary of gel fraction and crosslinking density of compounds 1a and 4a-4q.

| Compound | Gel fraction (%) | Crosslinking density (mol/m$^3$) |
|---|---|---|
| 1a | 90% ± 0% | 129.61 ± 4.83 |
| 4a | 72% ± 2% | 2.09 ± 0.79 |
| 4b | 82% ± 0% | 17 ± 0.32 |
| 4c | 78% ± 0% | 21.99 ± 2.31 |
| 4d | 88% ± 0% | 25.02 ± 1.77 |
| 4f | 88% ± 0% | 56.62 ± 1.40 |
| 4g | 87% ± 0% | 59.62 ± 2.33 |
| 4h | 89% ± 1% | 35.03 ± 0.76 |
| 4i | 89% ± 0% | 59.97 ± 1.60 |
| 4j | 89% ± 1% | 145.05 ± 17.90 |
| 4k | 88% ± 1% | 34.09 ± 0.68 |
| 4l | 89% ± 0% | 72.78 ± 0.61 |
| 4m | 92% ± 0% | 224.32 ± 2.42 |
| 4n | 81% ± 0% | 10 ± 0.51 |
| 4p | 84% ± 0% | 17.78 ± 0.14 |
| 4q | 90% ± 0% | 32.93 ± 1.98 |

Effect of Temperature on Triethylenediamine-Crosslinked Compounds 3b-3e

Milled compounds 3b-3e were used in this study. The gel fraction and crosslinking density of compounds 3b-3e are summarized in Table 11. As shown in Table 7, $t_{90}$ of compounds 3b-3e decreased when temperature is increased from 140° C. to 160° C., which means the rate of crosslinking is increased by increasing temperature at constant TED loading. For compounds 3c-3e (see FIG. 15), the crosslinking density is increased suddenly from 140° C. to 160° C., it is likely because of the better dispersion of TED in compound, since the melting point of TED is around 160° C. The better dispersion of TED causes more crosslinking to happen in compounds.

TABLE 11

Summary of gel fraction and crosslinking density of compounds 3b-3e.

| Compound | Gel fraction (%) | Crosslinking density (mol/m$^3$) |
|---|---|---|
| 3b-60° C. | 83% ± 1% | 17.55 ± 2.75 |
| 3c-60° C. | 84% ± 1% | 49.13 ± 2.75 |
| 3d-60° C. | 81% ± 1% | 25.02 ± 4.22 |
| 3e-60° C. | 84% ± 2% | 28.88 ± 3.68 |
| 3b-120° C. | 88% ± 0% | 32.81 ± 2.89 |
| 3c-120° C. | 88% ± 1% | 52.1 ± 2.97 |
| 3d-120° C. | 88% ± 2% | 33.74 ± 0.96 |
| 3e-120° C. | 89% ± 1% | 21.99 ± 5.14 |
| 3b-140° C. | 88% ± 2% | 31.42 ± 3.01 |
| 3c-140° C. | 89% ± 1% | 58.05 ± 3.03 |
| 3d-140° C. | 89% ± 2% | 27.36 ± 3.83 |
| 3e-140° C. | 91% ± 1% | 24.49 ± 2.09 |
| 3b-160° C. | 89% ± 1% | 34.25 ± 4.32 |
| 3c-160° C. | 90% ± 1% | 71.7 ± 4.5 |
| 3d-160° C. | 90% ± 3% | 67.07 ± 4.22 |
| 3e-160° C. | 93% ± 0% | 47.26 ± 3.11 |

Figure 15:
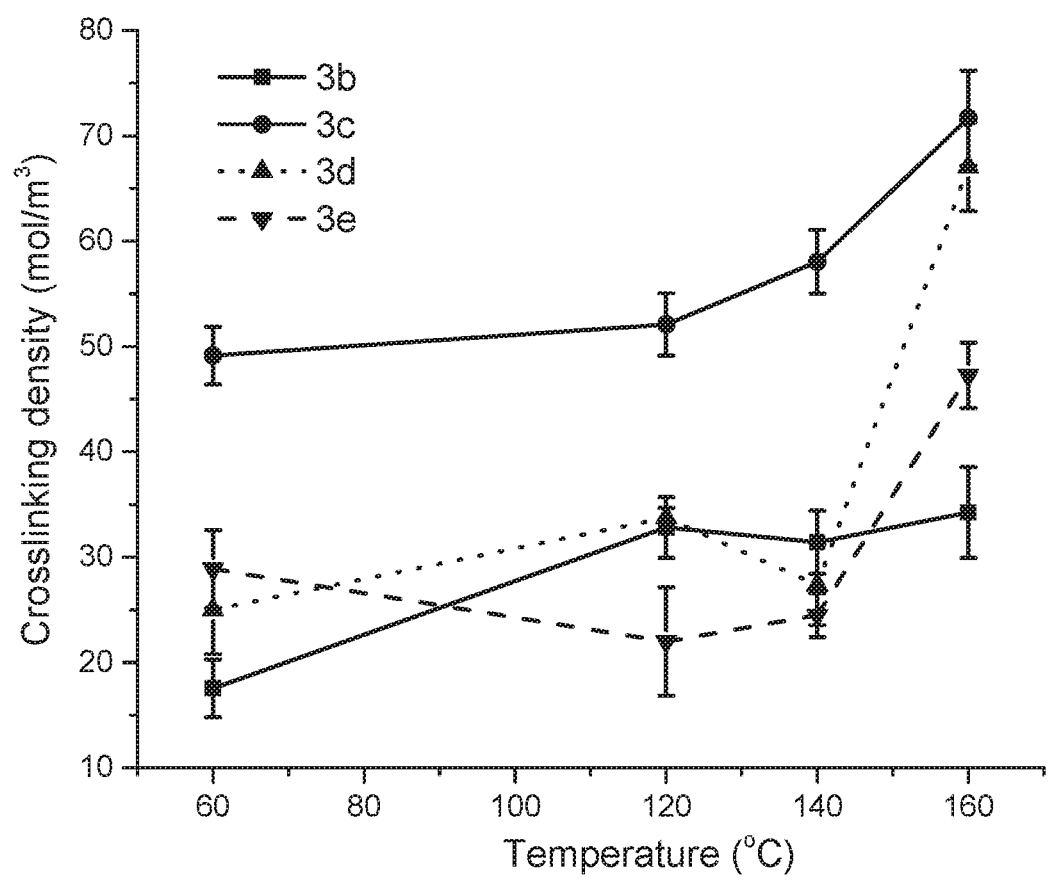
FIG. 15 is a graph showing crosslinking density-temperature curves for TED-Crosslinked compounds 3b-3e at different temperatures. Milled compounds 3b-3e were vulcanized at 60° C. for 33 hours, 120° C. for 4 hours, 140° C. for 2 hours, 160° C. for 1 hours, respectively.

The results are shown in FIG. 15.

The following examples are offered to more fully illustrate the invention, but are not to be construed as limiting the scope thereof. Further, while some of examples may include conclusions about the way the invention may function, the inventor do not intend to be bound by those conclusions, but put them forth only as possible explanations. Moreover, unless noted by use of past tense, presentation of an example does not imply that an experiment or procedure was, or was not, conducted, or that results were, or were not actually obtained. Efforts have been made to ensure accuracy with respect to numbers used (e.g., amounts, temperature), but some experimental errors and deviations may be present. Unless indicated otherwise, parts are parts by weight, molecular weight is weight average molecular weight, temperature is in degrees Centigrade, and pressure is at or near atmospheric.

EXAMPLES

Materials

All materials were purchased from Sigma-Aldrich and used as received except triethylamine and 2-Methyl-2-butene, which were dried over Na/K, distilled, and stored under nitrogen. Exxon Butyl 268S and Exxon Bromobutyl rubber 2222 were obtained from ExxonMobil Chemical Company, (Spring, Tex.).

Chemical Structure Characterization

Chemical structures of products were characterized by a Varian Mercury 300-MHz or a Varian Avance 500 MHz nuclear magnetic resonance (NMR). The solvent for NMR was Chloroform-D, Benzene-D6. GPC was performed at 30° C. using three tandem Waters HR styragel columns and THF as solvent. Eluents were monitored by using an inline Wyatt Dawn EOS multiangle laser light scattering (MALLS) detector and a Waters Model 2414 differential refractometer concentration detector. The concentration of solution was around 3 mg/mL.

Example 1

Synthesis of Perfluorophenyl Propiolate Ester

The flask was charged with anhydrous ether (60 mL), pentafluorophenol (5.32 g, 28.9 mmol), propiolate acid (1.69 mL, 27.54 mmol) and N,N'-dicyclohexylcarbodiimide (DCC) (6.82 g, 33.05 mmol) in the ice bath and stirred for 4 hours, then removed from the ice bath and stirred overnight. The solution was filtered to remove the insoluble N,N'-dicyclohexylurea (DCU). The solution was pumped down to give brown powders. The brown powders were sublimed at 50° C. oil bath under vacuum atmosphere to give colorless crystals. (3.3 g, 51%).

Example 2

Synthesis of Ethyl Propiolate Grafted 2-methyl-2-butene (Coagent 5)

Ethyl propiolate grafted 2-methyl-2-butene was synthesized as shown in Scheme 5, below.

Scheme 5

Synthesis of ethyl propiolate grafted 2-methyl-2-butene (Coagent 5)

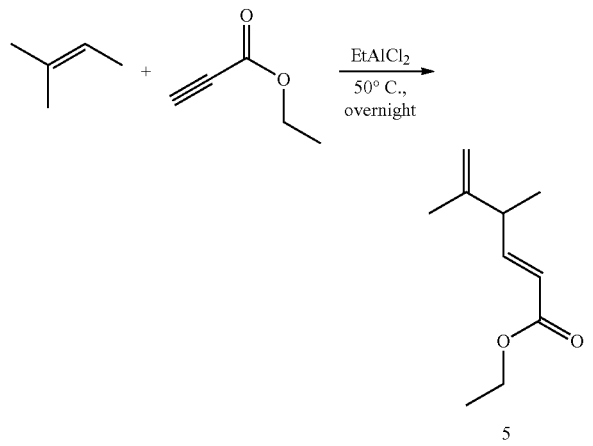

2-methyl-2-butene (Mw=70.13 g/mol, 10 mL, 94.4 mmol) was first dissolved in 50 mL anhydrous hexane under nitrogen atmosphere. Ethyl propiolate (Mw=98.1 g/mol, 2.44 mL, 24.1 mmol) was added into flask and dissolved quickly. The 1M stock solution of $EtAlCl_2$ in hexane (16 mL, 16 mmol) was added into the solution. The solution was stirred for 10 min, then the flask was transferred in 50° C. oil bath. The reaction time was 10 hours. After that 20 mL water was added into flask to stop the reaction. The suspension was centrifuged to form two layers. The top layer was transferred in flask and pumped down to remove the solvent. The yield was 53%.

Example 3

Synthesis of Perfluorophenyl Propiolate Ester Grafted Butyl Rubber (Polymer 3)

Figure 2:
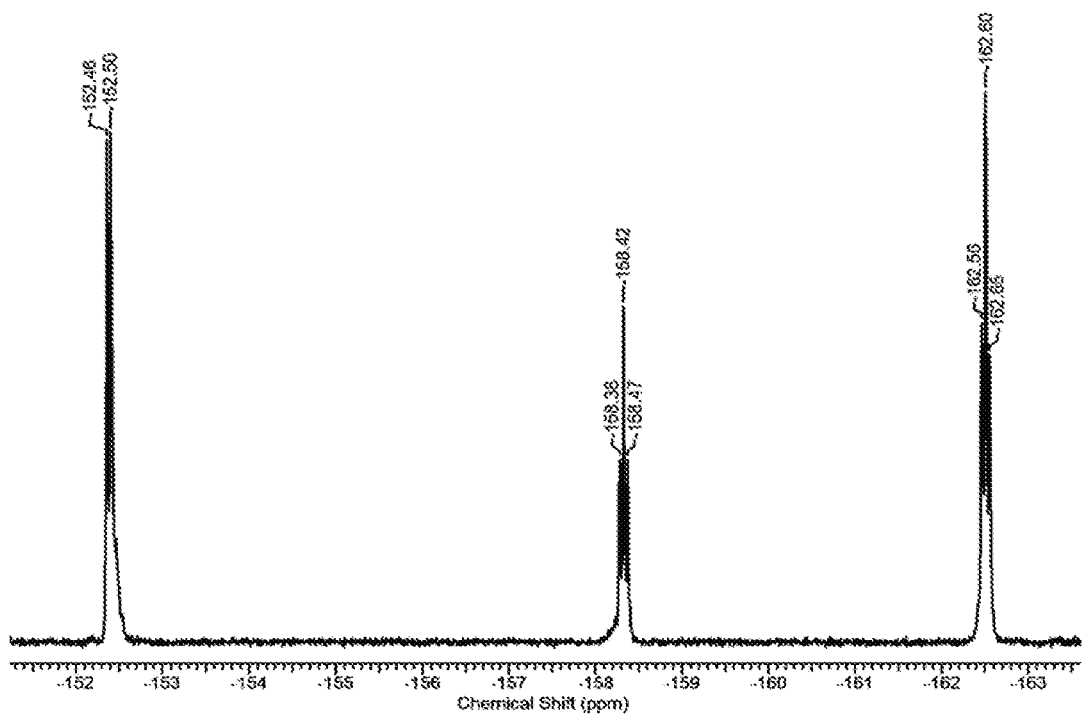
FIG. 2 is a $^{19}$F NMR spectrum of Polymer 3 in CDCl$_3$.

Butyl rubber (Exxon Butyl 268S, $M_w$=424858 g/mol, PDI=2.720, 10 g, 2.68 mmol C═C in rubber) was first dissolved in 150 mL anhydrous hexane under nitrogen atmosphere. Propiolate ester (1.27 g, 4.91 mmol) was added into flask and dissolved quickly. The 1M stock solution of $EtAlCl_2$ in hexane (2.68 mL, 2.68 mmol) was added into the solution. The reaction time was 1 hour. Then the solution was precipitated in ethanol stirred with mechanical stirrer. The solvent in rubber was removed under reduced pressure. The yield was 99%. $M_w$ of 3 was 457000 g/mol, PDI=3.89 according to GPC relative to polystyrene standards. The $^1H$ and $^{19}F$ NMR spectrums of Polymer 3 (500 MHz; $CDCl_3$) are shown in FIGS. 1 and 2.

Example 4

Synthesis of Ethyl Propiolate Grafted Butyl Rubber (Polymer 4)

Figure 3:
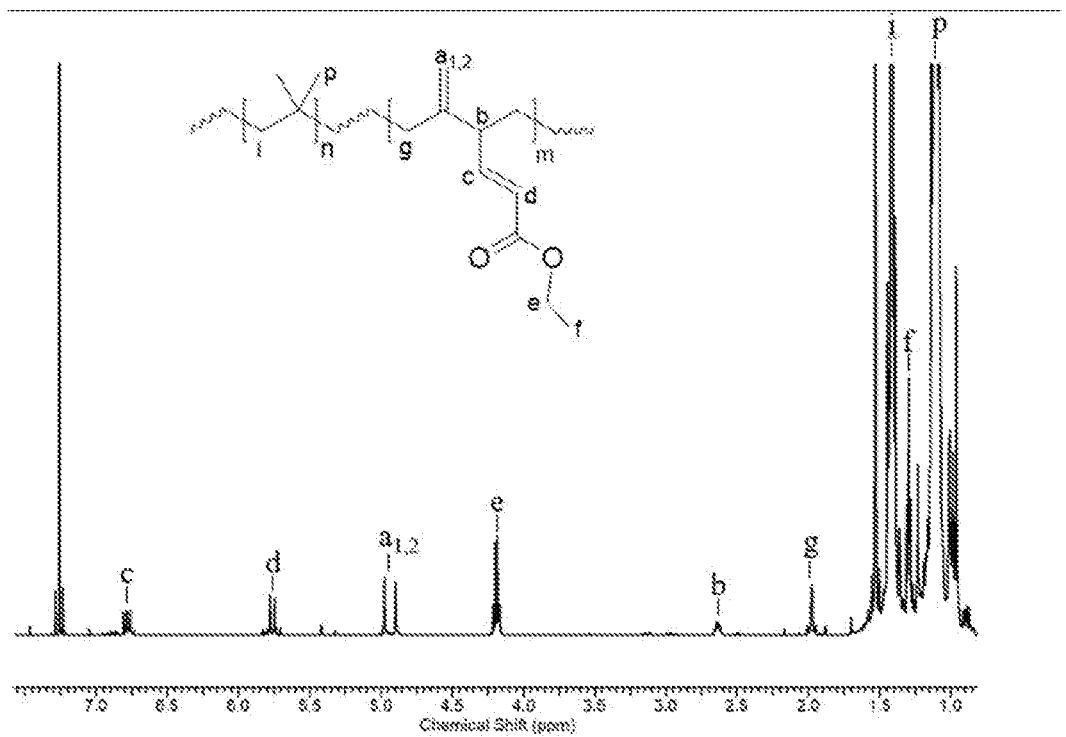
FIG. 3 is a $^1$H NMR spectrum of Polymer 4 in CDCl$_3$.
Figure 4:
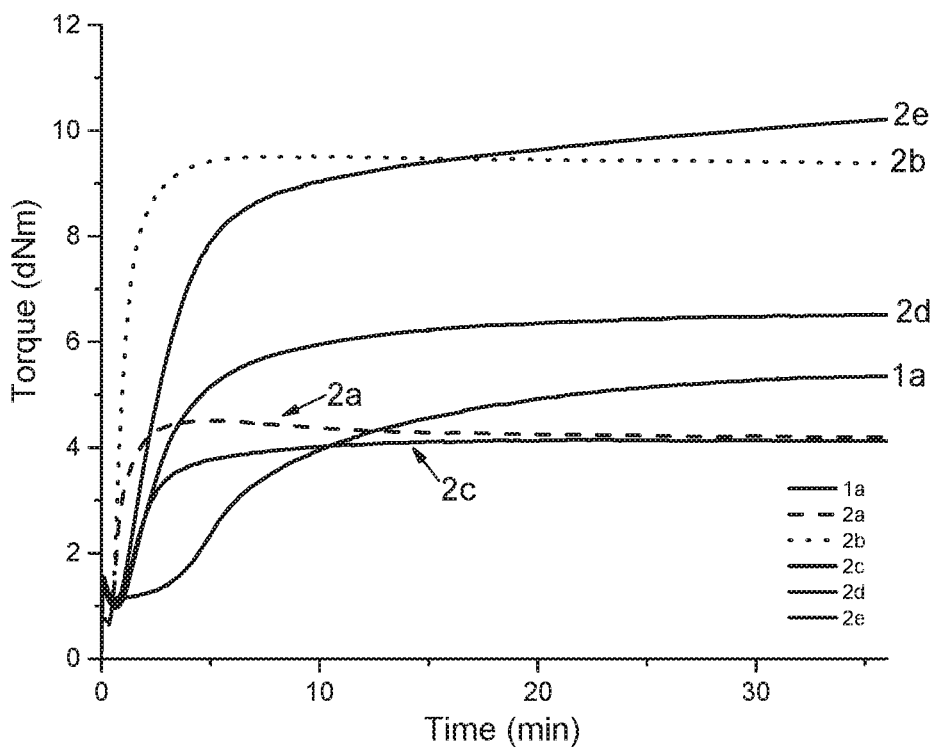
FIG. 4 is a graph showing curing kinetic curves for compounds 1a and 2a-2e. All compounds are cured at 160° C.
Figure 5:
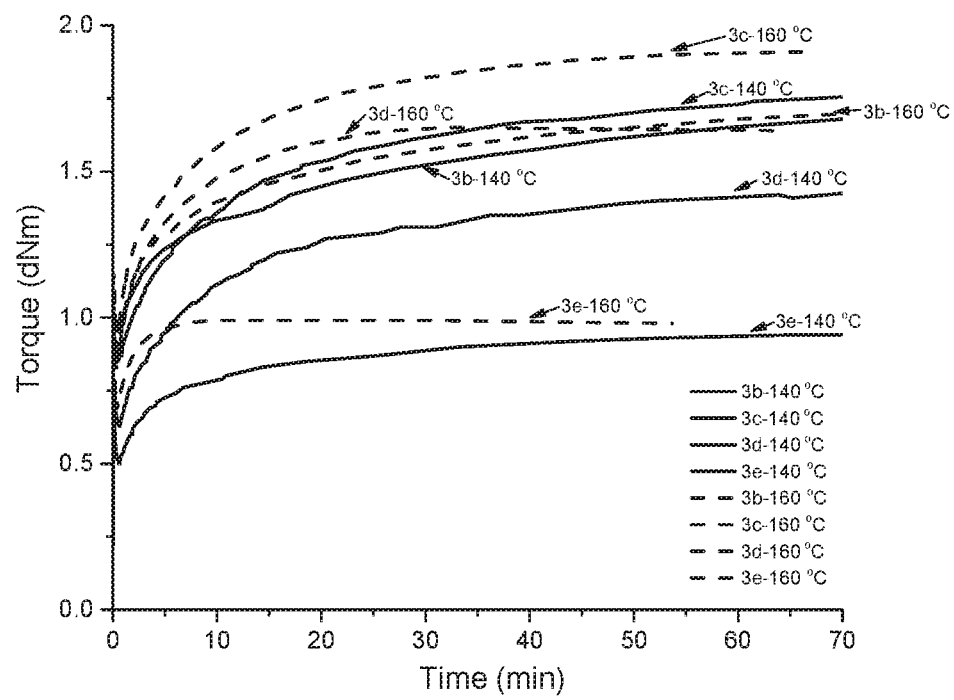
FIG. 5 is a graph showing curing kinetic curves for compounds 3b-3e. Solid lines are curves for curing at 140° C. and the dashed lines are curves for curing at 160° C.
Figure 6:
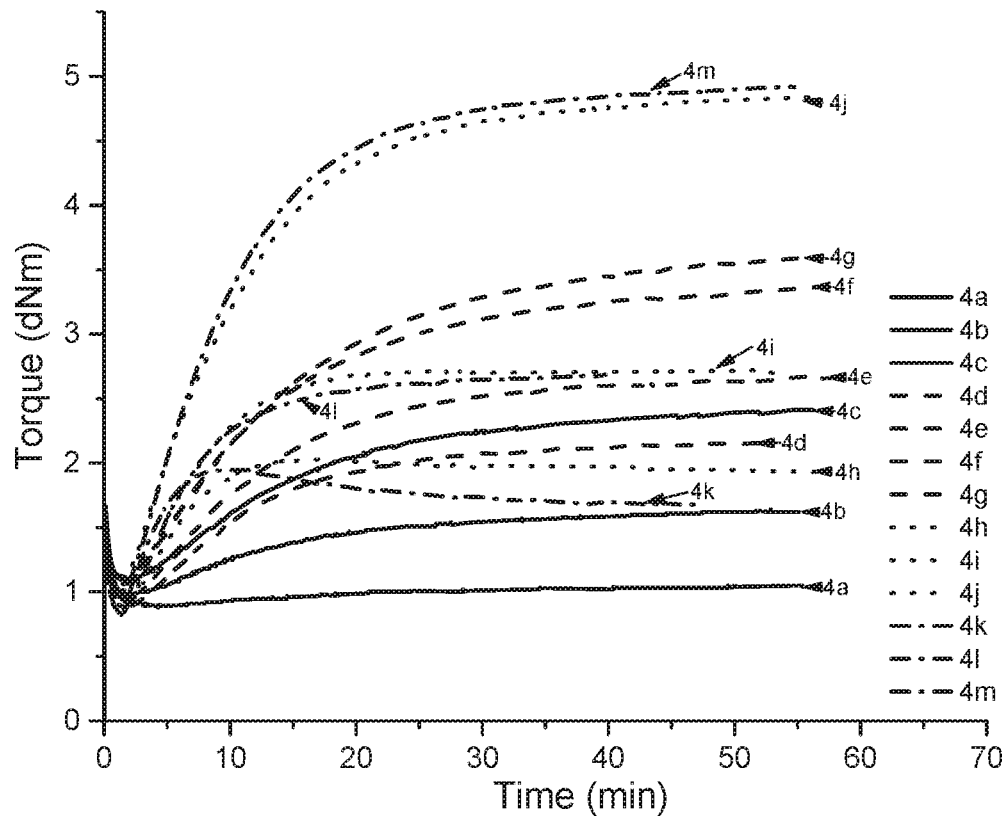
FIG. 6 is a graph showing curing kinetic curves of compounds 4a-4m. All compounds are cured at 160° C.
Figure 7:
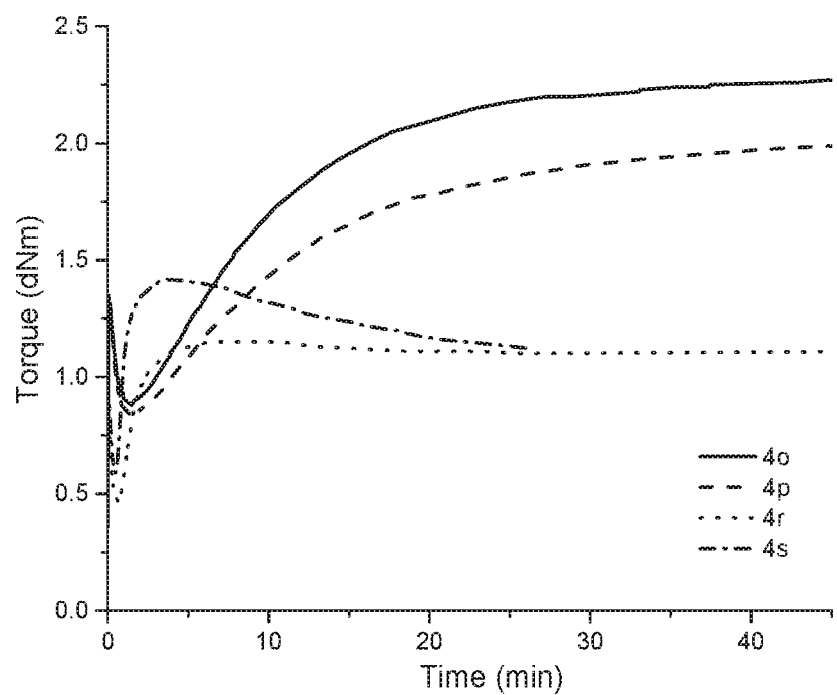
FIG. 7 is a graph showing curing kinetic curves of compounds 4o-4s. All compounds are cured at 160° C.

Butyl rubber (Exxon Butyl 268S, Mw=424858 g/mol, PDI=2.720, 150 g, 40.2 mmol C═C) was first dissolved in 1500 mL anhydrous hexane under nitrogen atmosphere. Ethyl propiolate (10 mL, 98.7 mmol) was added into flask and dissolved quickly. The 1M stock solution of $EtAlCl_2$ in hexane (86 mL, 86 mmol) was added into the solution. The reaction time was 15 hours in 50° C. oil bath. Then the solution was precipitated in ethanol stirred with mechanical stirrer. The solvent in rubber was removed under reduced pressure. The yield was 99%. Mw of Polymer 4 was 390689 g/mol, PDI=3.861. The $^1H$ NMR spectrum of Polymer 4 (500 MHz; $CDCl_3$) is shown in FIG. 3.

Example 5

Compounding of Polymer 1 with Sulfur-Based Curatives

The recipe for compounding of Polymer 1 is shown in Table 1, above. 10 g Exxon Butyl 268S was dissolved into chloroform (50 mL) in a 500 mL beaker. Sulfur, stearic acid, zinc oxide and tetramethylthiuram disulfide (TMTD), mercaptobenzothiazole (MBT) were added into the beaker. The solution was stirred overnight. The solvent was removed on a rotavap. The residual solvent was removed in a vacuum oven. The mixed rubber was milled for around 30 end roll passes on mill at 50° C. The compounds were placed on a MDR and heated to 160° C. for vulcanization. The curing time is $t_{90}$+10 min.

Example 6

Compounding of Polymer 2 (Bromobutyl Rubber) with N,N'-(1,3-Phenylene)dimaleimide (DMI) by Using a Two-Roll Mill The recipes for compounds 2a-2e are given in Table 2, above. While 10 g Exxon Bromobutyl Rubber 2222 was passed through the two-roll mill at 50° C., dicumyl peroxide (DCP) and DMI were added to the rubber slowly. Each compound was sheet out from two-roll mill after 30 times pass. The resulting compounds were placed in a hydrolic press and vulcanized at 160° C. The curing time is $t_{90}$+10 min.

Example 7

Compounding of Polymer 3 with TED by Using a Two-Roll Mill

The recipes for the compounds 3a-3e are shown in Table 3, above. Triethylenediamine (TED) was dissolved into 1-10 mL acetone. While 6 g Polymer 3 (See Example 3, above) was passed through the two-roll mill at 30° C., the acetone solution of TED was added on the sheet dropwise. The rubber sheet was passed through the mill 30 times. The compounds are placed in a hydrolic press and vulcanized at 25° C. (Compound 3a-3e), 60° C. (Compound 3a-3e), 120° C. (Compound 3a-3e), 140° C. (Compound 3a-3e) or 160° C. (Compound 3a-3e).

Example 8

Compounding of Polymer 4 with DMI by Using a Two-Roll Mill

The recipes for compounds 4a-4m are given in Table 4, above. While 8.5 g Polymer 4 (See Example 4, above) were passed through the two-roll mill at 50° C., DCP and DMI were added to the rubber slowly. Each compound was sheet out from two-roll mill after 30 times pass. The resulting compounds were placed in a hydrolic press and vulcanized at 160° C. The curing time is $t_{90}$+10 min. (See, FIG. 6)

Example 9

Compounding of Polymer 4, Ethyl Propiolate Grafted 2-methyl-2-butene (Coagent 5) with DMI by Using a Two-Roll Mill The recipes for compounds 4n-4q are given in Table 5, above. While 8.5 g Polymer 4 (See Example 4, above) were passed through the two-roll mill at 50° C., ethyl propiolate grafted 2-methyl-2-butene (coagent 5), DCP and DMI were added to the rubber slowly. Compound was sheet out from two-roll mill after 30 times pass. The resulting compounds were placed in a hydrolic press and vulcanized at 160° C. The curing time is $t_{90}$+10 min. (See, FIG. 7)

Example 10

Compounding of Polymer 4 with Trimethylolpropane Trimethacrylate (TMPTMA) by Using a Two-Roll Mill The recipes for compounds 4r-4u are given in Table 6, above. 8.5 g Polymer 4 (See Example 4, above) was dissolved into chloroform (80 mL) in a 500 mL beaker. DCP and TMPTMA were added into the beaker. The solution was stirred overnight. The solvent was removed by rotary evaporation. The residual solvent was removed in a vacuum oven. The mixed rubber was milled for around 30 end roll passes on mill at 50° C. The resulting compounds were placed in a hydrolic press and vulcanized at 160° C. The curing time is $t_{90}$+5 min. (See, FIG. 7)

Example 11

Swelling Tests

Swelling tests were performed on compounds 1a, 4a-4d, 4f-4n, 4p, and 4q. Sample was weighed and put into a 20 mL vial. Then 15 mL hexane was put into vial to swell the sample. The solvent was changed every 12 hours. The time for swelling test was 3 days. To weigh swollen sample, solvent on the surface of sample was removed by Kimwipes and swollen sample was weighed quickly. After that, the swollen sample was put into vacuum oven to remove solvent until mass of sample did not change. The final weight is called the weight of dry sample. The gel fraction and crosslinking density of all compounds were calculated by equation 1 and 2, which are shown below.

$$W_{gel} = \frac{M_{dry}}{M_o} \times 100\% \qquad 1$$

$W_{gel}$ is the gel fraction
$M_{dry}$ is the weight of dry sample
$M_o$ is the weight of rubber in original sample $$\text{In }(1-\varphi_r) + \varphi_r + \chi\varphi_r^2 = -\rho_{cx}V_s\left(\varphi_r^{1/3} - \frac{2\varphi_r}{f}\right) \qquad 2$$

$\varphi_r$ is volume fraction of rubber
$\chi$ is polymer-solvent interaction parameter, 0.516 is used here
$V_s$ is molar volume of solvent, 130.8 cm³/mol
$f$ is functionality of crosslinks, 4 is used here
$\rho_{cx}$ is crosslinking density in compounds, mol/cm³

The results of these swelling tests are reported in Tables 10 and 11.

Example 12

Mechanical Studies

Tensile test was performed on compounds 1a, 2a-2e, 3b-3e, and 4a-4d, and 4f-4t using an Instron Model 5567 equipped with a 1000 N load cell. Samples were cut into pieces with an ASTM D638 type V dumbbell die. Then samples were held in two clamps and extended at a rate of 500 mm/min at room temperature until failure. The results are reported in Tables 8 and 9.

The curing kinetics of Compounds 1a, 2a-2e, 3b-3e, 4a-4m, 4o, 4p, 4r, and 4s were tested using a Moving Die Rheometer (MDR) 2000. In these tests, 5 g sample was placed between two heated moving dies at 140° C. or 160° C. The sinusoidal shear was applied with frequency of 1.66 Hz and oscillation amplitude was ±0.5°. Torque during the process and curing time $t_{90}$ were recorded. These results are reported in Table 7 above, and are shown in FIGS. 4-7.

In light of the foregoing, it should be appreciated that the present invention significantly advances the art by providing an activated isobutylene-isoprene rubber compound and thermoset rubber made therefrom that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:
1. A curable rubber compound comprising one or more curative and an isobutylene-isoprene rubber derivative having the structure:

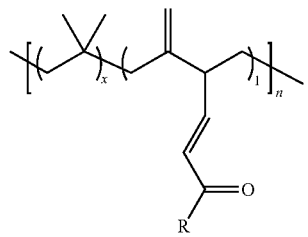

where R is an organic group, alkyl group, alkoxy group, aryl group or hydrogen, x is an average number from 20 to 100, and n is an average number from 20 to 500.

2. The curable rubber compound according to claim 1, wherein R is selected from the group consisting of methoxy, ethoxy, t-butoxy, phenoxy, pentafluorophenoxy, methyl, ethyl, t-butyl, and phenyl, and combinations thereof.

3. The curable rubber compound according to claim 1, wherein said one or more curative comprises sulfur.

4. The curable rubber compound according to claim 1, wherein said one or more curative comprises an organic base.

5. The curable rubber compound according to claim 1, wherein said one or more curative comprises a peroxide.

6. The curable rubber compound according to claim 1, wherein said one or more curative comprises a phenolic resin curative.

7. The curable rubber compound according to claim 1 further comprising one or more coagents.

8. A method for making the curable rubber compound according to claim 1 comprising:
   A) preparing an isobutylene-isoprene rubber derivative having the structure:

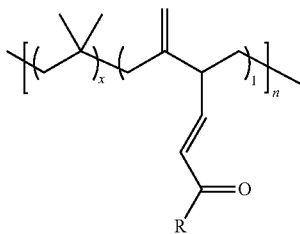

where R is an organic group, alkyl group, alkoxy group, aryl group or hydrogen, x is an average number from 20 to 100, and n is an average number from 20 to 500; and
   B) adding a curative; and
   C) mixing to distribute the curative throughout said isobutylene-isoprene rubber derivative.

9. The method of claim 8 wherein the step of preparing an isobutylene-isoprene rubber derivative (step A) comprises reacting an isobutylene-isoprene rubber with an acetylenyl organic carbonyl compound having the structure:

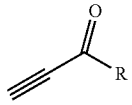

where R is an organic group or hydrogen.

10. The method of claim 8 wherein the step of preparing an isobutylene-isoprene rubber derivative comprises:
   1) preparing an isobutylene-isoprene rubber having the formula:

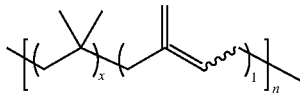

where R is an organic group, alkyl group, alkoxy group, aryl group, or hydrogen, x is an average number from 20 to 100, and n is an average number from 20 to 500;
   2) preparing a an acetylenyl organic carbonyl compound having the structure:

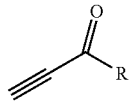

where R is an organic group or hydrogen;
   3) combining said isobutylene-isoprene rubber and said acetylenyl organic carbonyl compound in a saturated hydrocarbon solvent and initiating a alder-ene reaction between the triple bond in said acetylenyl organic carbonyl compound and the unsaturated double bond in an isoprene unit in said isobutylene-isoprene rubber to produce the isobutylene-isoprene rubber derivative of step A.

11. The method of claim 9 wherein R is selected from the group consisting of methoxy, ethoxy, t-butoxy, phenoxy, pentafluorophenoxy, methyl, ethyl, t-butyl, and phenyl, and combinations thereof.

12. The method of claim 10 wherein R is selected from the group consisting of methoxy, ethoxy, t-butoxy, phenoxy, pentafluorophenoxy, methyl, ethyl, t-butyl, and phenyl, and combinations thereof.

13. The method of claim 9 wherein the reaction between the isobutylene-isoprene rubber with the acetylenyl organic carbonyl compound is carried out in a saturated hydrocarbon solvent at a temperature between 20° C. to 150° C.

14. The method of claim 10 wherein the alder-ene reaction is carried out in said saturated hydrocarbon solvent at a temperature between 20° C. to 150° C.

15. The method of claim 10 wherein the alder-ene reaction between the isobutylene-isoprene rubber with the acetylenyl organic carbonyl compound is catalyzed by a Lewis acid.

16. The method of claim 15 wherein said Lewis acid is selected from the group consisting of aluminum trichloride, ethylaluminum dichloride, tris(pentafluorophenyl)boron, titanium tetrachloride, and combinations thereof.

17. The method of claim 8 wherein the step of adding a curative (step B) comprises adding a curative selected group the group consisting of sulfur-based curatives, organic base-based curatives, peroxide-based curatives, and combinations thereof.

18. The method of claim 9 wherein the step of adding a curative (step B) further comprises adding one or more co-agent.

19. An organic base-cured rubber compound comprising the curable rubber compound of claim 4.

20. The organic base-cured rubber compound of claim 19, having a tensile strength as measured by a tensometer, toughness as measured by a tensometer, or elongation as measured by tensometer, that is at least as good as a comparable sulfur cured isobutylene-isoprene butyl rubber.

21. A peroxide-cured rubber compound comprising the curable rubber compound of claim 5.

22. The peroxide-cured rubber compound of claim 21, having a tensile strength as measured by a tensometer, toughness as measured by tensometer, or elongation as measured by tensometer, that is at least as good as a comparable sulfur cured isobutylene-isoprene butyl rubber.

* * * * *